(12) United States Patent
Karczewicz et al.

(10) Patent No.: US 11,743,459 B2
(45) Date of Patent: Aug. 29, 2023

(54) FILTERING PROCESS FOR VIDEO CODING

(71) Applicant: QUALCOMM Incorporated, San Diego, CA (US)

(72) Inventors: Marta Karczewicz, San Diego, CA (US); Hongtao Wang, San Diego, CA (US); Jianle Chen, San Diego, CA (US); Venkata Meher Satchit Anand Kotra, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/448,547

(22) Filed: Sep. 23, 2021

(65) Prior Publication Data

US 2022/0103816 A1  Mar. 31, 2022

Related U.S. Application Data

(60) Provisional application No. 63/085,094, filed on Sep. 29, 2020.

(51) Int. Cl.
*H04N 19/117* (2014.01)
*H04N 19/82* (2014.01)
(Continued)

(52) U.S. Cl.
CPC ......... *H04N 19/117* (2014.11); *H04N 19/132* (2014.11); *H04N 19/176* (2014.11); *H04N 19/70* (2014.11); *H04N 19/82* (2014.11)

(58) Field of Classification Search
None
See application file for complete search history.

(56) References Cited

U.S. PATENT DOCUMENTS 6,289,041 B1 * 9/2001 Krasner ............... H04B 1/7077
342/357.77
6,347,154 B1 * 2/2002 Karanovic ............ H04N 19/59
348/E7.003

(Continued)

FOREIGN PATENT DOCUMENTS

EP  2575365 A1  4/2013
EP  2753088 A1  7/2014

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

(Continued)

*Primary Examiner* — Daniel Chang
(74) *Attorney, Agent, or Firm* — Shumaker & Sieffert, P.A.

(57) ABSTRACT

An example device for filtering decoded video data includes a memory configured to store video data; and one or more processors implemented in circuitry and configured to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block. The one or more processors may further encode the block prior to decoding the block. The one or more processors may encode or decode a value of a syntax element representing the scaling factor, e.g., in a picture header of a picture including the block.

54 Claims, 11 Drawing Sheets

(51) Int. Cl.
*H04N 19/176* (2014.01)
*H04N 19/70* (2014.01)
*H04N 19/132* (2014.01)

(56) References Cited

U.S. PATENT DOCUMENTS

| | | | |
|---|---|---|---|
| 2006/0221245 A1* | 10/2006 | Liang | G06T 3/4007 348/581 |
| 2007/0016427 A1 | 1/2007 | Thumpudi et al. | |
| 2009/0248424 A1* | 10/2009 | Koishida | G10L 19/24 704/503 |
| 2013/0051457 A1 | 2/2013 | Joshi et al. | |
| 2013/0114737 A1* | 5/2013 | Jagannathan | H04N 19/433 375/E7.193 |
| 2013/0215974 A1* | 8/2013 | Chong | H04N 19/40 375/240.24 |
| 2013/0322523 A1* | 12/2013 | Huang | H04N 19/134 375/240.02 |
| 2014/0192898 A1* | 7/2014 | Zhang | H04N 19/46 375/240.26 |
| 2014/0241422 A1 | 8/2014 | Lee et al. | |
| 2014/0341287 A1* | 11/2014 | Mody | H04N 19/82 375/240.13 |
| 2014/0376608 A1* | 12/2014 | Tourapis | H04N 19/463 375/240.02 |
| 2015/0350648 A1* | 12/2015 | Fu | H04N 19/117 375/240.02 |
| 2017/0094285 A1* | 3/2017 | Said | H04N 19/593 |
| 2017/0201330 A1* | 7/2017 | Zhou | H04B 10/697 |
| 2018/0160117 A1 | 6/2018 | Mukherjee et al. | |
| 2018/0160122 A1* | 6/2018 | Xu | H04N 19/176 |
| 2018/0220130 A1* | 8/2018 | Zhang | H04N 19/86 |
| 2018/0288408 A1* | 10/2018 | Ikai | H04N 19/11 |
| 2018/0359491 A1* | 12/2018 | Kang | H04N 19/186 |
| 2019/0045186 A1* | 2/2019 | Zhang | H04N 19/172 |
| 2019/0052877 A1* | 2/2019 | Zhang | H04N 19/124 |
| 2019/0273948 A1* | 9/2019 | Yin | H04N 19/176 |
| 2020/0084444 A1 | 3/2020 | Egilmez et al. | |
| 2020/0145658 A1* | 5/2020 | Chang | H04N 19/176 |
| 2020/0162731 A1* | 5/2020 | Kim | H04N 19/124 |
| 2020/0204801 A1 | 6/2020 | Hu et al. | |
| 2021/0058632 A1* | 2/2021 | Furht | H04N 19/44 |
| 2021/0127113 A1* | 4/2021 | Stepin | H04N 19/60 |

OTHER PUBLICATIONS

Chen J., et al., "AHG11: In-Loop Filtering with Convolutional Neural Network and Large Activation", JVET-U0104-v2, Joint Video Experts Team (JVET) of ITU-T SG 16 WP 3 and ISO/IEC JTC 1/SC 29, 21th Meeting: by teleconference, Jan. 6-15, 2021, pp. 1-5.

Hsiao Y-L., et al., "AHG9: Convolutional Neural Network Loop Filter", JVET-M0159-v1, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-6.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Li Y., et al., "CE10: Summary Report on Neural Network Based Filter for Video Coding", JVET-O0030-v4, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-10.

Li Y., et al., "CE13: Summary Report on Neural Network Based Filter for Video Coding", JVET-N0033-v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-11.

Liu S., at al., "JVET Common Test Conditions and Evaluation Procedures for Neural Network-Based Video Coding Technology", JVET-V2016-v3, Joint Video Experts Team (JVET) of ITU-T SG 16 WP 3 and ISO/IEC JTC 1/SC 29, 22nd Meeting, by teleconference, Apr. 20-28, 2021, pp. 1-10.

Liu S., et al., "JVET Common Test Conditions and Evaluation Procedures for Neural Network-Based Video Coding Technology", JVET-T2006-v2, Joint Video Experts Team (JVET) of ITU-T SG 16 WP 3 and ISO/IEC JTC 1/SC 29/WG 11, 20th Meeting: by teleconference, Oct. 7-16, 2020, pp. 1-9.

Liu S., et al., "Methodology and Reporting Template for Neural Network Coding Tool Testing", JVET-T0041-v4, Joint Video Experts Team (JVET) of ITU-T SG 16 WP 3 and ISO/IEC JTC 1/SC 29, 20th Meeting: by teleconference, Oct. 7-16, 2020, 14 Pages.

Timofte R., et al., "DIV2K Dataset: DIVerse 2K Resolution High Quality Images as Used for The Challenges @ NTIRE (CVPR 2017 and CVPR 2018) and @ PIRM (ECCV 2018)", 6 Pages, Retrieved from the Internet on Oct. 27, 2021, https://data.vision.ee.ethz.ch/cvl/DIV2K/.

Wang H., et al., "AHG11: Neural Network-Based In-Loop Filter", JVET-T0079-v3, Joint Video Experts Team (JVET) of ITU-T SG 16 WP 3 and ISO/IEC JTC 1/SC 29, 20th Meeting, by teleconference, Oct. 7-16, 2020, pp. 1-10.

Wang H., et al., "AHG11: Neural Network-Based In-Loop Filter Performance with No Deblocking Filtering Stage", JVET-U0115-v2, Joint Video Experts Team (JVET) of ITU-T SG 16 WP 3 and ISO/IEC JTC 1/SC 29, 21st Meeting, by teleconference, Jan. 6-15, 2021, pp. 1-5.

Wang H., et al., "EE: Tests on Neural Network-Based In-Loop Filter", JVET-U0094-v2, Joint Video Experts Team (JVET) of ITU-T SG 16 WP 3 and ISO/IEC JTC 1/SC 29, 21st Meeting, by teleconference, Jan. 6-15, 2021, pp. 1-9.

Wang H., et al., "EE1-1 4: Test on Neural Network-Based In-Loop Filter with Large Activation Layer", JVET-V0115-v3, Joint Video Experts Team (JVET) of ITU-T SG 16 WP 3 and ISO/IEC JTC 1/SC 29, 22nd Meeting, by teleconference, Apr. 20-28, 2021, pp. 1-6.

Wang H., et al., "EE1-1.4: Test on Neural Network-Based In-Loop Filter with Large Activation Layer", JVET-W0130-v1, Joint Video Experts Team (JVET) of ITU-T SG 16 WP 3 and ISO/IEC JTC 1/SC 29, 23rd Meeting, by teleconference, Jul. 7-16, 2021, pp. 1-5.

Wang H., et al., "EE1-Related: Neural Network-Based In-Loop Filter with Constrained Computational Complexity", JVET-W0131-V2, Joint Video Experts Team (JVET) of ITU-T SG 16 WP 3 and ISO/IEC JTC 1/SC 29, 23rd Meeting, by teleconference, Jul. 7-16, 2021, pp. 1-5.

Zhang F., et al., "BVI-DVC: A Training Database for Deep Video Compression", Apr. 1, 2020, https://doi.org/10.5523/oris.3hj4t64fkbrgn2ghwp9en4vhtn, 3 Pages.

International Search Report and Written Opinion—PCT/US2021/051979—ISA/EPO—dated Jan. 26, 2022, 15 pp.

McCann K., et al., "HM3: High Efficiency Video Coding (HEVC)Test Model 3 Encoder Description," 5th JCT-VC Meeting; 96th MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-E602, Mar. 29, 2011 (Mar. 29, 2011), XP030009013, 34 pages, ISSN: 0000-0003.

Ouedraogo (Canon) N., et al., "On APS Referring and Updating", 9.JCT-VC Meeting, Apr. 27, 2012-May 7, 2012, Geneva, (Joint Collaborative Team on Video Coding of ISO/IEC JTC1/SC29/WG11 and ITU-TSG.16), No. JCTVC-I0189 Apr. 28, 2012 (Apr. 28, 2012), XP030233828, 10 Pages, Retrieved from the Internet: URL: http://phenix.int-evry.fr/ict/doc_end_user/documents/9_Geneva/wg11/JCTVC-I0189-v3.zip. JCTVC-I0189r1.doc [Retrieved on Apr. 28, 2012].

\* cited by examiner

FILTERING PROCESS FOR VIDEO CODING

This application claims the benefit of U.S. Provisional Application No. 63/085,094, filed Sep. 29, 2020, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering video data. In particular, this disclosure describes techniques for a filtering process applied to a distorted picture. The filtering process of this disclosure may be based on neural network technologies, and may be used in the context of advanced video codecs, such as extensions of the Versatile Video Coding (VVC) standard, the next generation of video coding standards, and/or any other video codecs.

In one example, a method of filtering decoded video data includes decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

In another example, a device for filtering decoded video data includes a memory configured to store video data; and one or more processors implemented in circuitry and configured to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

In another example, a computer-readable storage medium has stored thereon instructions that, when executed, cause a processor to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

In another example, a device for filtering decoded video data includes means for decoding a block of video data to form a decoded block; means for applying a filter to the decoded block to form a filtered block; means for multiplying samples of the filtered block by a scaling factor to form a refined filtered block; and means for combining samples of the refined filtered block with corresponding samples of the decoded block.

The details of one or more examples are set forth in the accompanying drawings and the description below. Other features, objects, and advantages will be apparent from the description, drawings, and claims.

DETAILED DESCRIPTION

Figure 1:
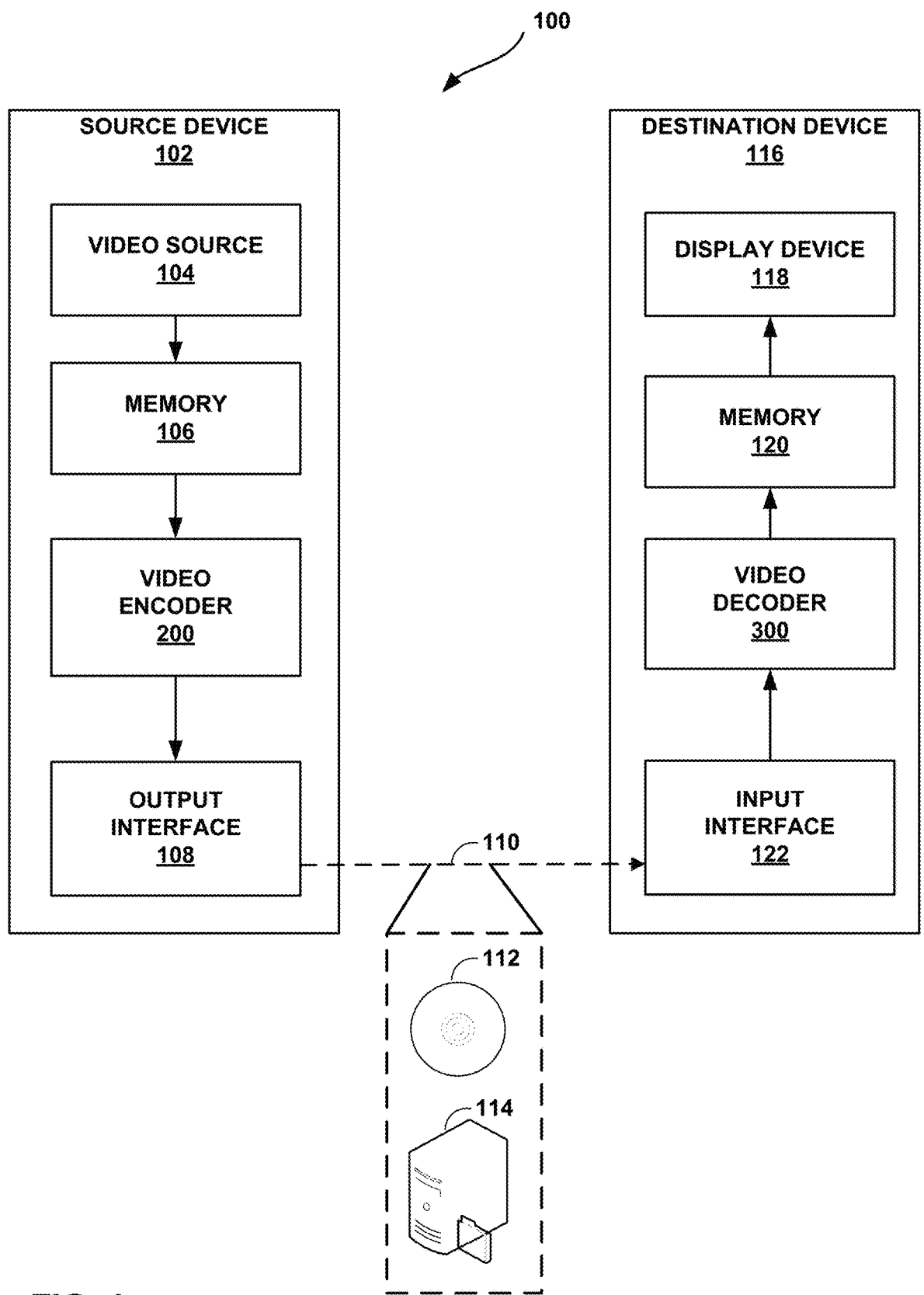
FIG. 1 is a block diagram illustrating an example video encoding and decoding system that may perform the techniques of this disclosure.

In general, this disclosure describes techniques related to filtering decoded video data. In general, a video decoder may decode blocks of video data, e.g., using inter/intra prediction to generate prediction blocks, and then combining the prediction blocks with decoded residual blocks. A video encoder may encode blocks of video data, then decode the blocks in a manner substantially similar to the decoder, such that any distortion introduced via the encoding process is also replicated at the video encoder when performing predictive encoding.

Moreover, a video encoder and a video decoder may be configured to filter the decoded blocks of video data. For example, the video encoder and video decoder may perform "in-loop" filtering in the same manner, such that filtered decoded blocks of video data are used for reference when performing subsequent predictive coding (encoding or decoding). Such filters may include, for example, adaptive loop filters (ALF), neural network (NN) based filters, or the like.

Pre-defined filters are generally constructed or trained on a large set of video and image data in a database. While this construction process may result in optimized filters for general video data, there may be specific cases of video data for which the output of the filters could be improved. This disclosure describes techniques that may be used to improve filtering of decoded video data.

In general, the techniques of this disclosure include decoding video data, applying a filter to the decoded video data, then applying a scaling factor the filtered, decoded video data. The scaling factor may improve the results of the filtering. For example, the video encoder may determine the scaling factor, e.g., using a rate-distortion optimization (RDO) process. The video encoder may determine the scaling factor for a slice of video data, a picture of video data, a sequence of pictures of video data, at a block level (e.g., a coding tree unit (CTU)), or the like. Thus, the video encoder may encode data representing the scaling factor. The video encoder may further encode data indicating whether to perform filtering refinement according to the techniques of this disclosure. The video encoder may then apply the scaling factor to filtered, decoded video data and store resulting refined, filtered, decoded video data in a decoded picture buffer (DPB).

The video decoder, similarly, may receive the data indicating whether to perform filtering refinement. When the data indicates that the video decoder is to perform filtering refinement, the video decoder may decode the data representing the scaling factor, e.g., in a slice header, an adaptive parameter set (APS), a picture header, a picture parameter set (PPS), a block header (e.g., a CTU header), or the like. The video decoder may then apply the scaling factor to filtered, decoded video data and store the resulting refined filtered, decoded video data in a DPB. The video decoder may also output the refined filtered, decoded video data from the DPB as output decoded video data for purposes of display.

In this manner, the filtered data may be improved using the scaling factor. Thus, the refined, filtered data may more accurately reflect raw video data as originally received by the video encoder. As such, the refined, filtered data may improve prediction of subsequent video data, thereby reducing bitrates associated with an encoded video bitstream. Moreover, the refined, filtered data may have reduced distortion, thereby being more visually pleasing to a user viewing the displayed video data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for filtering video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-52001-vA (hereinafter "VVC"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below, video encoder 200 and video decoder 300 may be configured to perform one or more filter techniques of this disclosure, including neural-network based filter techniques.

Figure 2:
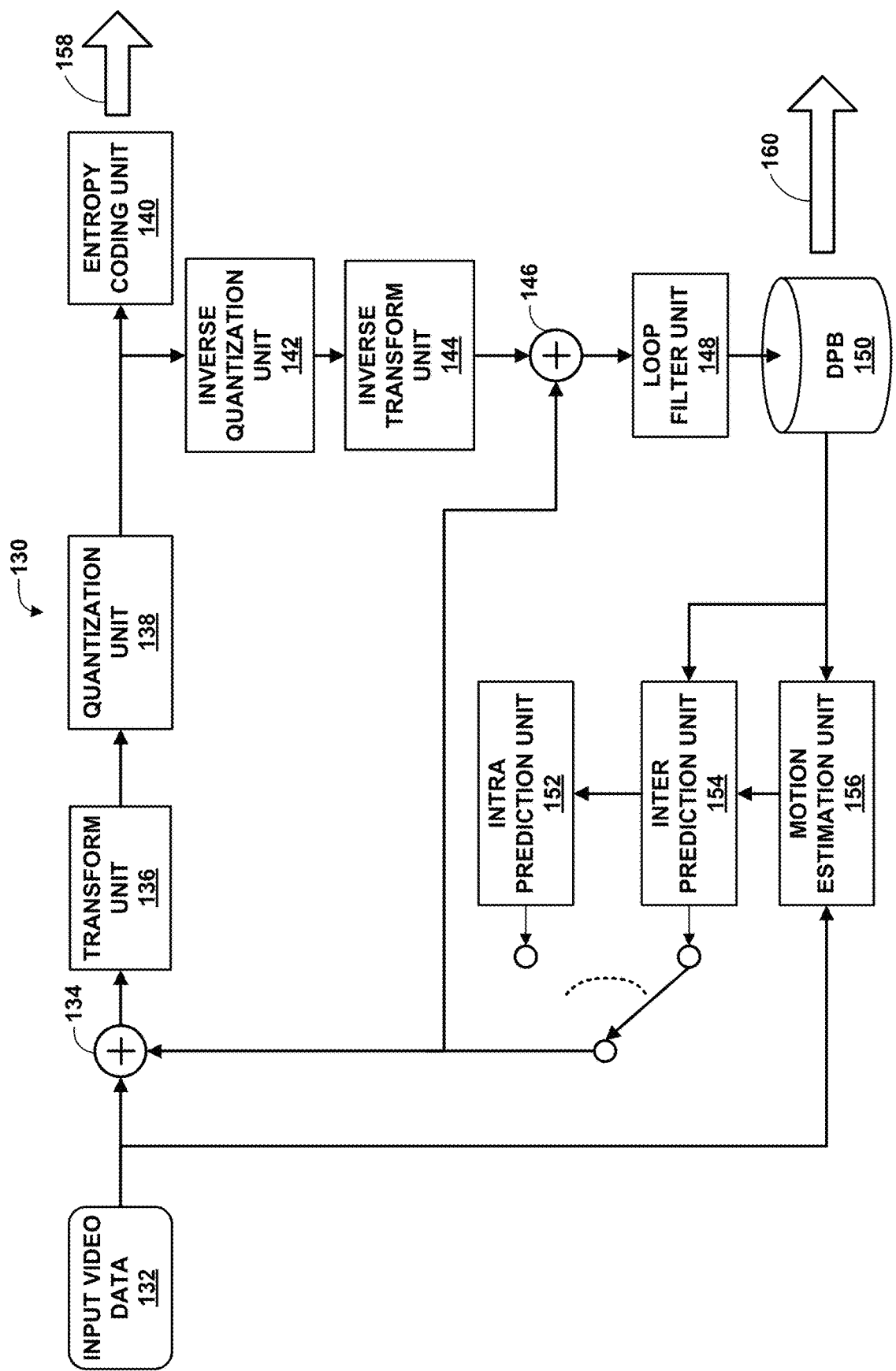
FIG. 2 is a block diagram showing an example hybrid video coding framework.

Most video coding standards since H.261 have been based on the so-called hybrid video coding principle, which is illustrated in FIG. 2.

FIG. 2 is a block diagram showing an example hybrid video coding framework. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two most recent standards: HEVC and VVC.

As shown in FIG. 2, a modern hybrid video coder 130 generally includes block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. The early video coding standards used a fixed block size, typically 16×16 samples. Recent standards, such as HEVC and VVC, employ tree-based partitioning structures to provide flexible partitioning.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in all the modern video codecs, the prediction is obtained from one or more previously decoded pictures, i.e., the reference picture(s). The corresponding areas to generate the inter prediction are indicated by motion information, including motion vectors and reference picture indices.

Summation unit 134 may calculate residual data as differences between input video data 132 and predicted data from intra prediction unit 152 or inter prediction unit 134. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

In accordance with the techniques of this disclosure, loop filter unit 148 may be further configured to refine the filtered decoded blocks. For example, loop filter unit 148 may apply a scaling factor to the filtered decoded blocks to form refined filtered decoded blocks. Loop filter unit 148 may then add the refined filtered decoded blocks to the corresponding decoded blocks. Loop filter unit 148 may then store these final blocks to DPB 150. The data of DPB 150 may be used as reference data, e.g., by inter prediction unit 154 or intra prediction unit 152, and may also be output as output video data 160.

Figure 3:
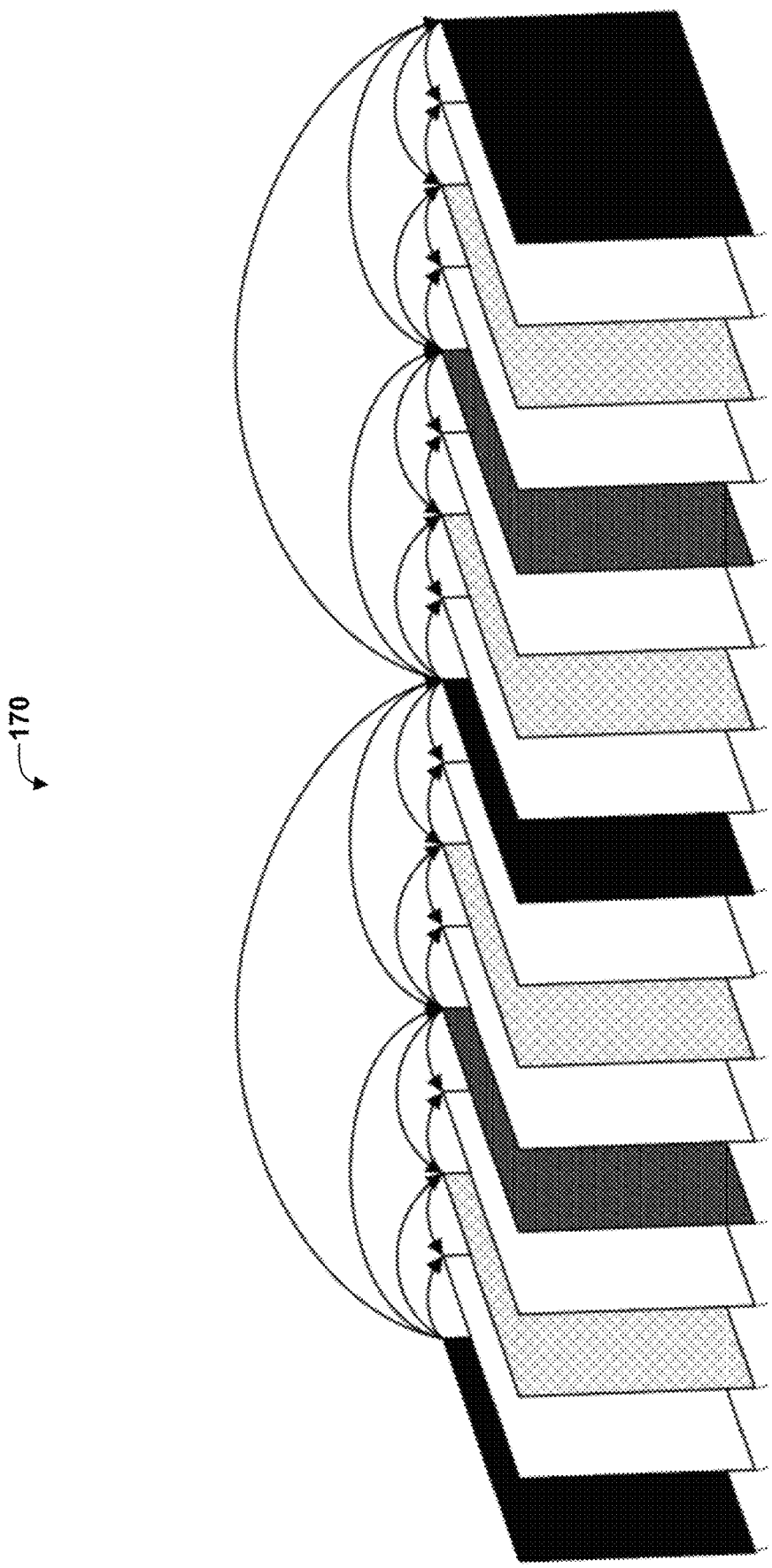
FIG. 3 is a conceptual diagram showing hierarchical prediction structures with a group of pictures (GOP) size equal to 16.

FIG. 3 is a conceptual diagram showing a hierarchical prediction structure 170 with a group of pictures (GOP) size equal to 16.

Intra-picture prediction exploits the spatial redundancy that exists within a picture (hence "intra") by deriving the prediction for a block from already coded/decoded, spatially neighboring (reference) samples. The directional angular prediction, DC prediction, and plane or planar prediction are used in the most recent video codecs, including AVC, HEVC and VVC.

Some example hybrid video coding standards apply a block transform to the prediction residual (regardless of whether it comes from inter- or intra-picture prediction). In early standards, including H.261/262/263, discrete cosine transforms (DCTs) are employed. In HEVC and VVC, more transform kernels besides DCT are applied in order to account for different statistics in the specific video signal.

Quantization aims to reduce the precision of an input value or a set of input values in order to decrease the amount of data needed to represent the values. In hybrid video coding, the quantization is typically applied to individual transformed residual samples, e.g., to transform coefficients, resulting in integer coefficient levels. In recent video coding standards, the step size is derived from a so-called quantization parameter (QP) that controls the fidelity and bit rate. A larger step size lowers the bit rate, but also may deteriorate the quality, which, e.g., may result in video pictures exhibiting blocking artifacts and blurred details.

Context-adaptive binary arithmetic coding (CABAC) is used in recent video codecs, e.g., AVC, HEVC and VVC, due to its high efficiency.

Post/In-Loop Filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 2, the reconstructed pictures after in-loop filtering are stored and used as a reference for inter-picture prediction of subsequent pictures. The coding artifacts are mostly determined by the QP. Therefore, QP information is generally used in the design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i,j)=R(i,j)+((\Sigma_{k\neq 0}\Sigma_{l\neq 0}f(k,l)\times K(R(i+k,j+l)-R(i,j), c(k,l))+64)>>7) \quad (1)$$

where R(i,j) is the samples before filtering process, R'(i,j) is the sample value after filtering process. f(k,l) denotes the filter coefficients, K(x,y) is the clipping function, and c(k,l) denotes the clipping parameters. The variables k and l may vary between $$-\frac{L}{2} \text{ and } \frac{L}{2}$$

where L denotes the filter length. The clipping function is K(x,y)=min(y,max(−y,x)), which corresponds to the function Clip3(−y,y,x). The clipping operation introduces non-linearity to make ALF more efficient by reducing the impact of neighbor sample values that are too different relative to the current sample value. In VVC, the filtering parameters can be signaled in the bitstream, and can be selected from the pre-defined filter sets. The ALF filtering process can also be summarized as indicated by the following equation:

$$R'(i,j)=R(i,j)+\text{ALF\_residual\_ouput}(R) \quad (2)$$

In some examples, it has been shown that embedding a neural network into a hybrid video coding framework can improve compression efficiency. Neural networks have been used in the module of intra prediction and inter prediction to improve the prediction efficiency. NN-based in loop filters are also a research topic in recent years. In some examples, the filtering process is applied as a post-filter. In this case, the filtering process is only applied to the output picture and the un-filtered picture is used as a reference picture.

The NN-based filter can be applied additionally, on top of the existing filters, such as deblocking filter, SAO and ALF. The NN-based filter can also be applied exclusively, where the NN-based filter is designed to replace all the existing filters.

Figure 4:
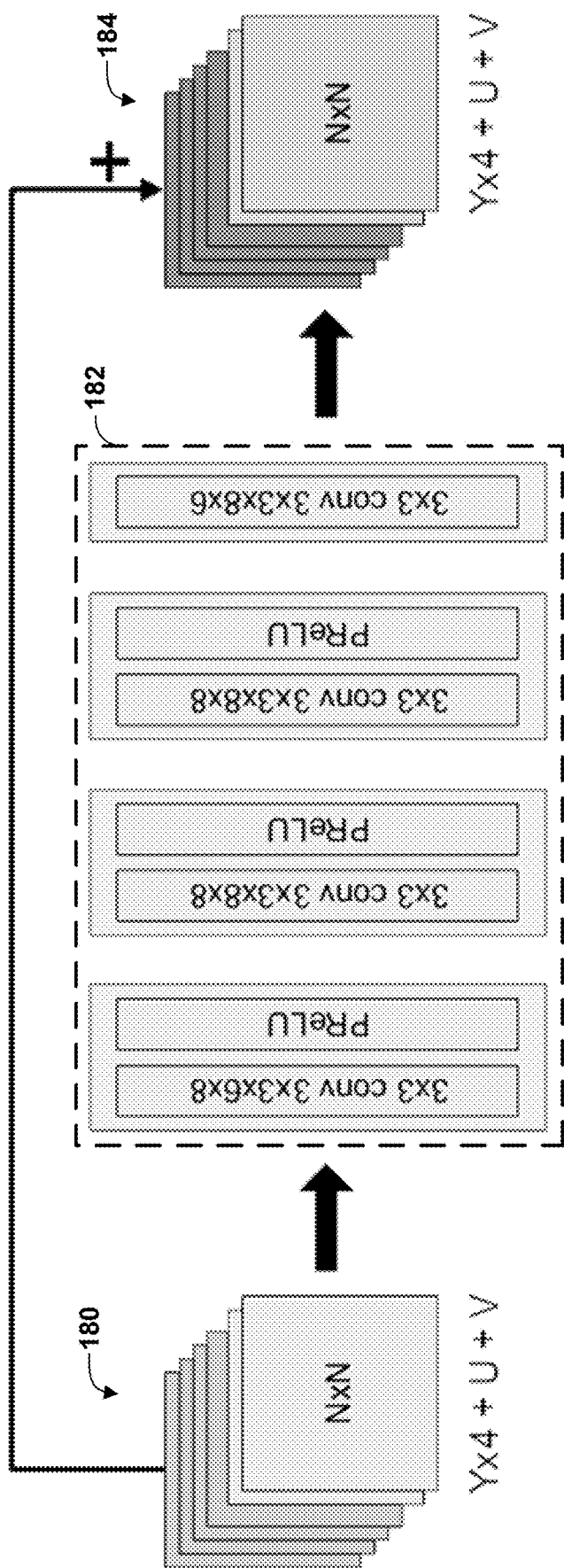
FIG. 4 is a block diagram showing an example convolutional neural network-based filter with four layers.

FIG. 4 is a block diagram showing an example convolutional neural network-based filter with four layers. As shown in FIG. 4, a NN-based filtering process 182 takes reconstructed samples 180 as inputs, and the intermediate outputs are residual samples, which are added back to the input to refine the input samples, thereby producing refined data 184. The NN filter may use all color components as input to exploit cross-component correlations. The different components may share the same filters (including network structure and model parameters) or each component may have its own specific filters.

The filtering process can also be generalized as follows:

$$R'(i,j)=R(i,j)+\text{NN\_filter\_residual\_ouput}(R) \quad (3)$$

The model structure and model parameters of the NN-based filter(s) can be pre-defined and stored at video encoder 200 and video decoder 300. The filters can also be signaled in the bitstream.

Problems may be present in existing NN-based filters for video coding. For example, the pre-defined filters (e.g., NN-based filters or ALF) may be trained based on a large set of video and image database. Such training set may be optimal in a general sense, but may be not optimal for a specific distorted sequence.

This disclosure describes the following techniques that may improve the coding efficiency and/or improve distortion when using NN-based filters for video coding. The following itemized techniques may be applied individually. Alternatively, any combination of the techniques described below may be applied. Video encoder 200 and video decoder 300 may be configured according to any of the various techniques of this disclosure, alone or in any combination.

Referring back to FIG. 1, in one example of this disclosure, video encoder 200 and video decoder 300 may be configured to apply a refining process to the output residual of the filtering process and then add the refined filter output residual to update the input samples. The proposed method can be expressed as:

$$R'(i,j)=R(i,j)+f(\text{filter\_residual\_ouput}(R)) \quad (4)$$

where f( ) is a function of refining process applied to the filtering output residual of a specific filtering process. Video encoder 200 and video decoder 300 may be configured to apply one or more of the following processes as a refining process.

a. As one example, video encoder 200 and video decoder 300 may modify filtered values through multiplying a scaling factor by filtered samples of a decoded block, then add the refined filtered values to the decoded block to update the input samples.
   i. Video encoder 200 may quantize the scaling factor with an integer value having a pre-defined bit accuracy. Video decoder 300 may inverse quantize the value by the integer value having the pre-defined bit accuracy to determine the scaling factor.
   ii. Video encoder 200 may signal the value of the scaling factor in the bitstream. Video decoder 300 may determine the value of the scaling factor from data signaled in the bitstream.
   iii. Video encoder 200 may signal the value of the scaling factor in the bitstream as a syntax element in a slice header, a picture header, a picture parameter set (PPS), an adaptive parameter set (APS), or any other high level syntax element body. Video decoder 300 may determine the scaling factor from the data signaled in the corresponding data structure.
   iv. Video encoder 200 may signal the value of the scaling factor in the bitstream as a syntax element at block level, e.g., at the CTU level. Video decoder 300 may determine the scaling factor from the data signaled at the block level.
   v. Video encoder 200 may signal a set of scaling factors in the bitstream, or the set of scaling factors may be pre-defined at video encoder 200 and video decoder 300. Video encoder 200 may signal an index at block, e.g., CTU level, to specify the value of the scaling factor. Video decoder 300 may use a table mapping index values to the set of scaling factors to determine the scaling factor from the index value.
   vi. The scaling factor may be derived separately for each color component. That is, video encoder 200 may individually signal scaling factors for each color component (e.g., a luminance component, a blue hue component, and a red hue component). Video decoder 300 may determine the scaling factors for each color component from the signaled values.

b. As another example, video encoder 200 and video decoder 300 may modify filtering output residuals through multiplying a scaling factor and adding an offset to the scaled filtered values, then add the refined filtered values to the input samples.
   i. Video encoder 200 may quantize the scaling factor with an integer value having a pre-defined bit accuracy. Video decoder 300 may inverse quantize the value by the integer value having the pre-defined bit accuracy to determine the scaling factor.
   ii. Video encoder 200 may quantize the offset with an integer value having a pre-defined bit accuracy. Video decoder 300 may inverse quantize the value by the integer value having the pre-defined bit accuracy to determine the offset.
   iii. Video encoder 200 may signal the values of the scaling factor and the offset in the bitstream. Video decoder 300 may determine the values of the scaling factor and the offset from data signaled in the bitstream.
   iv. Video encoder 200 may signal the values of the scaling factor and the offset in the bitstream as a syntax element in a slice header, a picture header, a picture parameter set (PPS), an adaptive parameter set (APS), or any other high level syntax element body. Video decoder 300 may determine the scaling factor and the offset from the data signaled in the corresponding data structure.
   v. The value of scaling factor and offset may be derived at the encoding process and signaled in the bitstream as a syntax element in slice header, picture header, Adaptive Parameter set (APS), or any other high level syntax element body.
   vi. Video encoder 200 may signal the values of the scaling factor and the offset in the bitstream as a syntax element at block level, e.g., at the CTU level. Video decoder 300 may determine the scaling factor and the offset from the data signaled at the block level.
   vii. Video encoder 200 may signal a set of scaling factors and a set of offsets in the bitstream, or the set of scaling factors and the set of offsets may be pre-defined at video encoder 200 and video decoder 300. Video encoder 200 may signal index values at the block level, e.g., CTU level, to specify the values of the scaling factor and the offset. Video decoder 300 may use respective tables mapping index values to the set of scaling factors and the set of offsets to determine the scaling factor and the offset from the index values.
   viii. The scaling factor and offset may be derived separately for each color component. That is, video encoder 200 may individually signal scaling factors and offsets for each color component (e.g., a luminance component, a blue hue component, and a red hue component). Video decoder 300 may determine the scaling factors and offsets for each color component from the signaled values.

c. The filtering process mentioned in this disclosure could be any filtering process that generates the residual outputs which is used to update the input sample.
   i. As an example, the filtering process mentioned in this section is a NN-based filter.
   ii. As another example, the filtering process mentioned in this section is a NN-based loop filter applied in the context of video codecs.
   iii. As another example, the filtering process mentioned in this section is a NN-based post filter applied in the context of video codecs.
   iv. As another example, the filtering process mentioned in this section is an adaptive in-loop filter applied in the context of video codecs.

v. As another example, the filtering process mentioned in this section is a pre-defined adaptive in-loop filter applied in the context of video codecs.

d. A flag may be signaled to indicate whether the refinement application is applied or not applied to refine the filter output residual. The flag(s) may be signaled in the bitstream as a syntax element in slice header, picture header, picture parameter set (PPS), adaptive parameter set (APS), or any other high level syntax element body.

Thus, video encoder 200 and video decoder 300 may be configured to decode a block of video data, then apply a filter to the decoded block of video data. The filter may be one of a neural network-based filter, a neural network-based loop filter, a neural network-based post loop filter, an adaptive in-loop filter, or a pre-defined adaptive in-loop filter. In some examples, video encoder 200 and video decoder 300 may apply a combination of such filters to the decoded block of video data.

After filtering the decoded block (thereby forming a filtered block), video encoder 200 and video decoder 300 may refine the filtered block, e.g., by multiplying samples of the filtered block by a scaling factor to form a refined filtered block. Video encoder 200 and video decoder 300 may then combine samples of the decoded block with corresponding samples of the refined filtered block. Video encoder 200 and video decoder 300 may execute formula (4) above to form the refined filtered block and combine the refined filtered block with the decoded block to form the ultimate decoded and filtered block that is stored in a decoded picture buffer (DPB) and used for output.

Video encoder 200 may determine the scaling factor according to a rate-distortion optimization (RDO) process. For example, video encoder 200 may test a variety of different scaling factors and determine which of the tested scaling factors reduces distortion without overly increasing a bitrate of a corresponding bitstream. Video encoder 200 may select the scaling factor having the best RDO performance as the scaling factor for the block (or a slice or picture including the block). Video encoder 200 may then encode data representing the selected scaling factor, e.g., as a value of a syntax element in a slice header, an adaptive parameter set (APS), a picture header, a picture parameter set (PPS), a block header (e.g., a CTU header), or the like. Video decoder 300 may determine the scaling factor from the encoded data representing the scaling factor.

In some examples, video encoder 200 and video decoder 300 may code a value of a syntax element that directly represents the scaling factor. In some examples, video encoder 200 and video decoder 300 may be configured with a lookup table that maps index values to scaling factors, and video encoder 200 may encode a value representing an index value corresponding to the selected scaling factor. Thus, video decoder 300 may decode the index value and determine the scaling factor using the index value and the lookup table, i.e., by determining the scaling factor to which the lookup table maps the index value. The lookup table may also be referred to as an index table.

In some examples, video encoder 200 may further determine whether to enable filtering refinement as discussed above. For example, if none of the scaling factors yields an adequate RDO value, video encoder 200 may disable filtering refinement, e.g., by signaling a value for a syntax element indicating that filtering refinement is disabled. Video decoder 300 may use the value for the syntax element to determine whether to perform filtering refinement.

In some examples, video encoder 200 may quantize a value representing the scaling factor by an integer value having a pre-defined bit accuracy. Thus, video decoder 300 may inverse quantize a decoded value by the integer value having the pre-defined bit accuracy to determine the scaling factor.

In another example of the disclosure, the output residual of multiple filters are combined to update the input samples. As one example, the proposed method can be expressed as:

$$R'(i,j)=R(i,j)+f1(\text{filter1\_residual\_ouput}(R))+f2(\text{filter2\_residual\_ouput}(R)) \quad (5)$$

where f1( ) and f2( ) are a function of a refining process applied to the filtering output residual of specific filtering process. The combination of more than one model can be generalized as follows:

$$R'(i,j)=R(i,j)+f1(\text{filter1\_residual\_ouput}(R))+ \ldots +fK(\text{filter}K\_\text{residual\_output}(R)) \quad (6)$$

In other words, video encoder 200 and video decoder 300 may apply two or more (e.g., a plurality) of scaling factors and filters to the decoded block to form respective refined filtered blocks, then combine the decoded block with the refined filtered blocks, e.g., according to either of formulas (5) or (6) above.

Video encoder 200 and video decoder 300 may be configured to apply one or more of the following processes as a refining process.

a) As one example, video encoder 200 and video decoder 300 may modify the output residual of each filtering process, including multiplying a scaling factor and then combining the refined filtered blocks with the input samples.

i) Video encoder 200 may quantize the scaling factors by an integer value with a pre-defined bit accuracy. Video decoder 300 may inverse quantize the scaling factors by the integer value with the pre-defined bit accuracy.

ii) Video encoder 200 may derive the values of the scaling factors during the encoding process and signal these values in the bitstream. Video decoder 300 may determine the scaling factors from the signaled values.

iii) Video encoder 200 may signal the values of the scaling factors as a syntax element in a slice header, a picture header, a picture parameter set (PPS), an adaptive parameter set (APS), or any other high level syntax element body. Video decoder 300 may determine the values of the scaling factors from the corresponding data structure.

iv) Video encoder 200 may signal the values of the scaling factors in the bitstream as a syntax element at block level, e.g., at CTU level. Video decoder 300 may determine the values of the scaling factors from the signaled block level syntax element(s).

v) Video encoder 200 may signal a set of scaling factors in the bitstream, or the values of the scaling factors may be pre-defined at video encoder 200 and video decoder 300. Video encoder 200 may signal index values at block level, e.g., at CTU level, to specify the values of the scaling factors.

vi) Video encoder 200 may separately signal scaling factors for each color component, and video decoder 300 may determine the scaling factors for each color component separately from the signaled values.

b) As one example, video encoder 200 and video decoder 300 may modify the output residuals of each filtering process through multiplying respective scaling factors, and adding an offset. Video encoder 200 and video decoder 300 may then add the refined filtered data to the input samples.
  i) Video encoder 200 may quantize the scaling factors by an integer value with a pre-defined bit accuracy. Video decoder 300 may inverse quantize the scaling factors by the integer value with the pre-defined bit accuracy.
  ii) Video encoder 200 may quantize the offset by an integer value with a pre-defined bit accuracy. Video decoder 300 may inverse quantize the offset by the integer value with the pre-defined bit accuracy.
  iii) Video encoder 200 may derive the values of the scaling factors and the offset during the encoding process and signal these values in the bitstream. Video decoder 300 may determine the scaling factors and the offset from the signaled values.
  iv) Video encoder 200 may signal the values of the scaling factors and the offset as syntax elements in a slice header, a picture header, a picture parameter set (PPS), an adaptive parameter set (APS), or any other high level syntax element body. Video decoder 300 may determine the values of the scaling factors and the offset from the corresponding data structures.
  v) To save the signaling over-head of scaling factors, some pre-defined, fixed scaling factors may be used both at video encoder 200 and video decoder 300. The table below shows an example of different scaling factors:

| Index | Scaling factors | |
|---|---|---|
| | Input Bit Depth | Value |
| 0 | 8 | 10 |
| | 10 | 25 |
| | . | . |
| | . | . |
| | . | . |
| | 16 | 512 |
| 1 | 8 | 50 |
| | 10 | 25 |
| | . | . |
| | . | . |
| | . | . |
| | 16 | 712 |
| 2 | 8 | 125 |
| and so on. | 10 | 256 |
| | . | . |
| | . | . |
| | . | . |
| | 16 | 800 |

Video encoder 200 may select one of the scaling factors based on an RD-cost, then signal the best scaling factor (i.e., the scaling factor having the best RD-cost) using a direct representation of the scaling factor or an index representing the scaling factor in data of the bitstream. The index can be coded as unary code or truncated binary code, or variable length coded based on the statistical properties of the scaling factor. When the scaling factor has a particular value, which is most probable across all input sequences, then unary code signaling can be chosen as a choice of signaling method, wherein, the least index value can be assigned to most a probable scaling factor value.
  vi. The value of scaling factors and offset may be derived at the encoding process and signaled in the bitstream as a syntax element at a block level, e.g., at a CTU level.
  vii. A set of scaling factors and offsets are signaled in bitstream, or pre-defined at encoder and decoder side, and an index is signaled at block, e.g., CTU level to specify the value of scaling factor and offset.
  viii. The scaling factors and offset may be derived separately for each color component.
c) The filtering process mentioned in this disclosure could be any filtering process that generates the residual outputs which is used to update the input sample.
  i. As an example, the filtering process mentioned in this section is a NN-based filter.
  ii. As another example, the filtering process mentioned in this section is a set of NN-based loop filters applied in the context of video codecs.
  iii. As another example, the filtering process mentioned in this section is a set of NN-based post filters applied in the context of video codecs.
  iv. As another example, the filtering process mentioned in this section is an adaptive in-loop filter applied in the context of video codecs.
  v. As another example, the filtering process mentioned in this section is a pre-defined adaptive in-loop filter applied in the context of video codecs.

As an example, one of the proposed ideas can be implemented by using the following equation:

$$R'(i,j)=R(i,j)+((Scale\_factor*filter\_residual\_ouput(R)+ (1<<(shift-1))+offset)>>shift) \quad (7)$$

The 'shift' value is a pre-defined positive integer. The value of shift can be equal to any positive value. A typical value of shift could be in range of 4 to 8. The scale_factor is quantized with 'shift' bits and its values are signaled in the bitstream. The value of 'offset' can be set equal to zero. Alternatively, the value of offset can be signaled in the bitstream. In this example, the filter_residual_ouput is quantized with the same accuracy as the input samples As another example, the scale_factor is quantized with N bits with the value of N smaller than "shift". In this example, the filter_residual_ouput is quantized with a higher accuracy than that of the input samples.

A clip operation may be further applied to clip the value of R'(i,j) to the dynamic range of the original input samples.

As an example, one of the proposed ideas can be implemented by using the following equation.

$$R'(i,j)=R(i,j)+((Scale\_factor1*filter1\_residual\_ouput (R)+((Scale\_factor2*filter2\_residual\_ouput(R)+ (1<<(shift-1))+offset)>>shift) \quad (8)$$

The 'shift' value of formula (8) is a pre-defined positive integer. The value of shift can be equal to any positive value. An example value of shift could be in range of 4 to 8. The scale_factor1 and scale_factor2 are quantized with 'shift' bits and their values are signaled in the bitstream. The value of 'offset' can be set equal to zero. In another example, the value of 'offset' can be signaled in the bitstream. In this example, the filter1_residual_ouput and filter2_residual_ouput are quantized with the same accuracy as the input samples As another example, the scale_factor1 and scale_factor2 may be quantized with N bits with the value of N smaller than "shift". In this example, the filter_residual_ouput is quantized with a higher accuracy than that of the input samples.

A clip operation may be further applied to clip the value of R'(i,j) to the dynamic range of the original input samples.

Figure 5A:
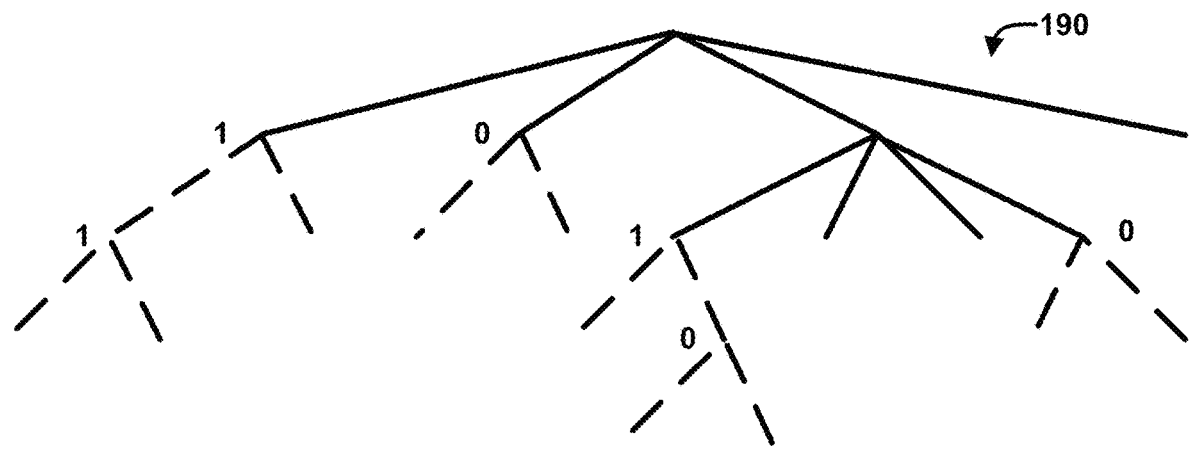
FIGS. 5A and 5B are conceptual diagrams illustrating an example quadtree binary tree (QTBT) structure, and a corresponding coding tree unit (CTU).
Figure 5B:
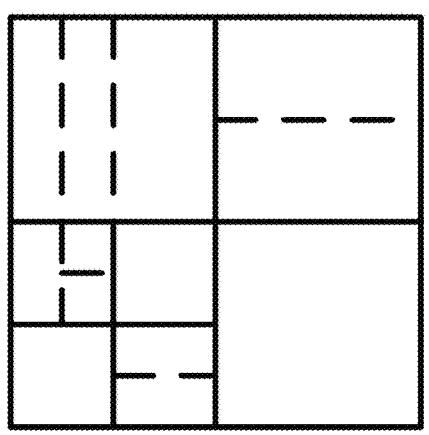

FIGS. 5A and 5B are conceptual diagrams illustrating an example quadtree binary tree (QTBT) structure 190, and a corresponding coding tree unit (CTU) 192. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 190 (i.e., the solid lines) and syntax elements (such as splitting information) for a prediction tree level of QTBT structure 190 (i.e., the dashed lines). Video encoder 200 may encode, and video decoder 300 may decode, video data, such as prediction and transform data, for CUs represented by terminal leaf nodes of QTBT structure 190.

In general, CTU 192 of FIG. 5B may be associated with parameters defining sizes of blocks corresponding to nodes of QTBT structure 190 at the first and second levels. These parameters may include a CTU size (representing a size of CTU 192 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 190 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 190 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 6:
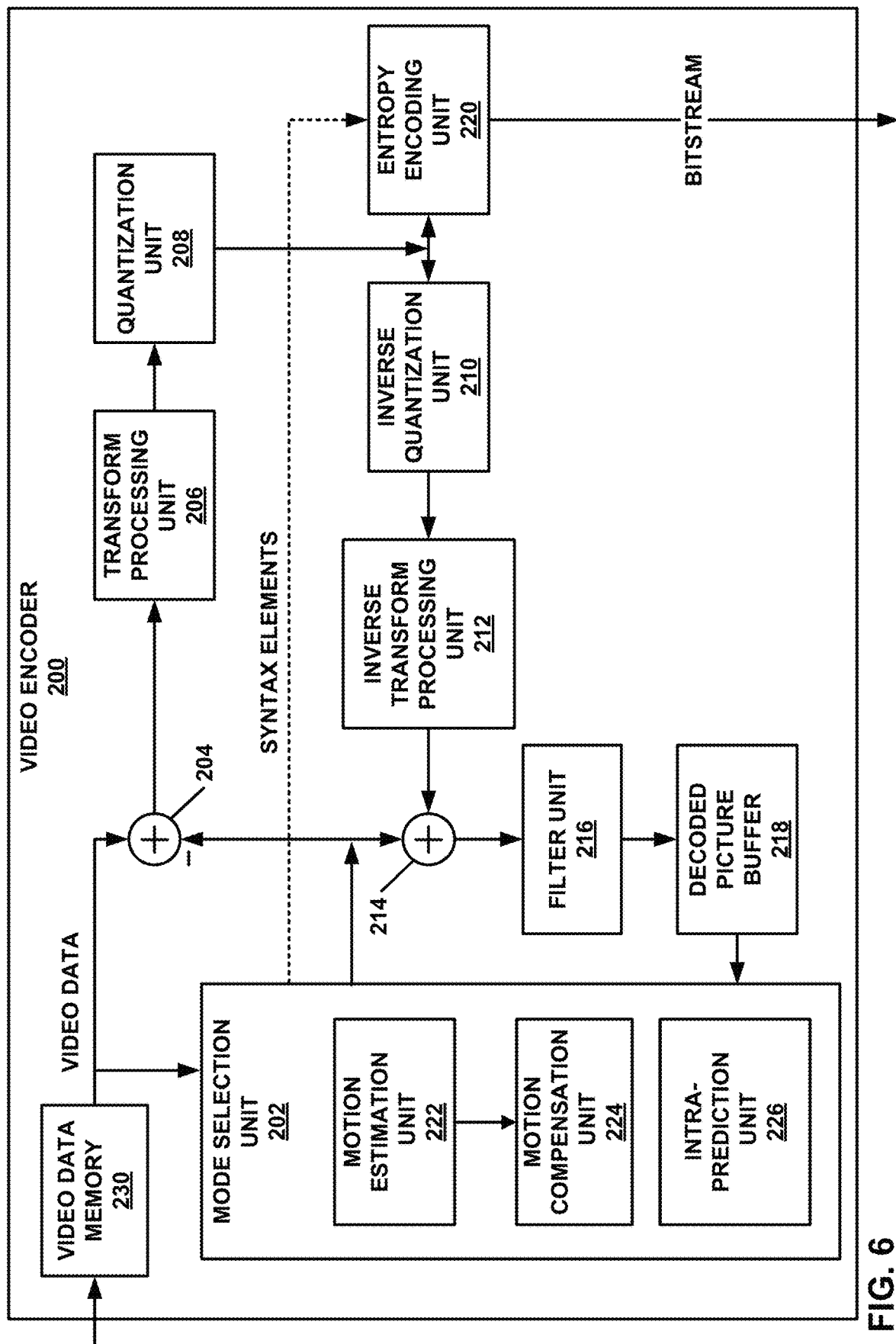
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof.

Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs/TUs. Operations of filter unit 216 may be skipped, in some examples. In addition, filter unit 216 may be configured to perform one or more filter techniques of this disclosure, including neural-network based filter techniques.

In particular, filter unit 216 may be configured to apply at least one of a neural network-based filter, a neural network-based loop filter, a neural network-based post loop filter, an adaptive in-loop filter, or a pre-defined adaptive in-loop filter to a decoded block of video data to form one or more filtered decoded blocks. Filter unit 216 may then refine the filtered decoded blocks by applying one or more scaling factors to the filtered decoded blocks. For example, filter unit 216 may test one or more dynamically determined or predefined scaling factors to the filtered decoded blocks. For example, filter unit 216 may apply one of formulas (3)-(8) discussed above to refine the filtered decoded blocks. Mode selection unit 202 may perform a rate-distortion optimization (RDO) process to calculate RDO values for each of the tested scaling factors, representing distortion and bitrate for the various scaling factors. Mode selection unit 202 may select the scaling factor(s) yielding the best RDO value.

In addition, mode selection unit 202 may provide data representing an enabling flag for filter refinement and data representing the scaling factors to entropy encoding unit 220. Thus, entropy encoding unit 220 may encode the flag (having a value representing whether filter refinement using scaling factors is enabled), as well as values representing the scaling factor(s) for a particular unit of video data, e.g., a slice, picture, CTU, or the like. For example, entropy encoding unit 220 may encode data directly representing the scaling factors, or index values representing the scaling factors in a lookup table (e.g., an index table).

In some examples, filter unit 216 may further apply an offset value to the scaled filtered decoded blocks to form the refined filtered decoded blocks. Mode selection unit 202 may similarly provide data representing the offset value(s) to entropy encoding unit 220, which may encode the offset values, e.g., directly or using index values.

Entropy encoding unit 220 may encode data representing the scaling factors and the offset values (when applied) in a picture header, a picture parameter set (PPS), a slice header, and/or an adaptive parameter set (APS), or other such high level syntax structure.

Video encoder 200 stores (potentially filtered and refined) reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the refined filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to filter decoded video data including a memory configured to store video data, and one or more processors implemented in circuitry and configured to decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Figure 7:
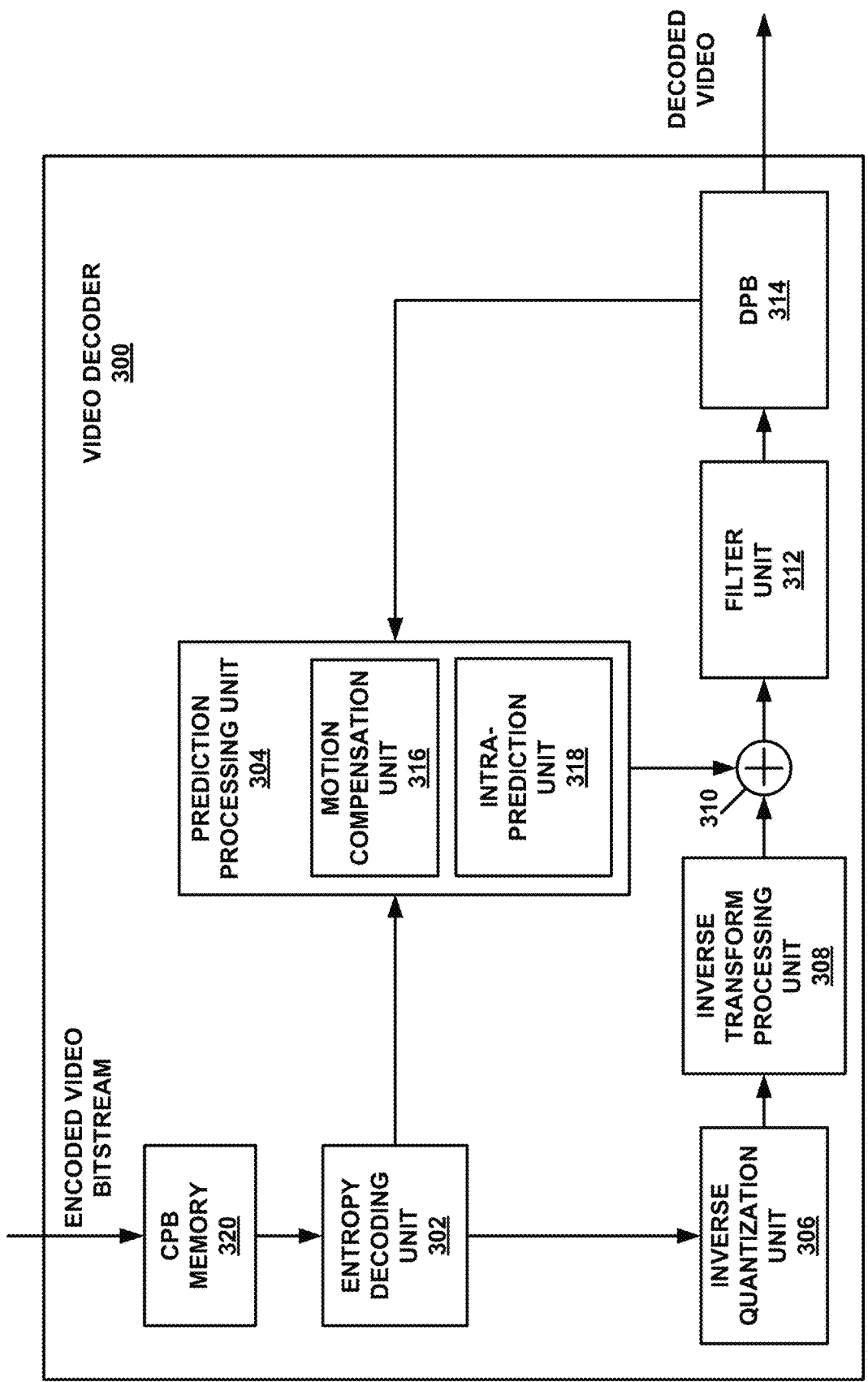
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266), and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In addition, filer unit 312 may be configured to perform one or more filter techniques of this disclosure, including neural-network based filter techniques.

In particular, initially, entropy decoding unit 302 may decode a value for a flag representing whether refinement filtering is to be applied. In the case that refinement filtering is to be applied, entropy decoding unit 302 may entropy decode data representing one or more scaling factors. For example, entropy decoding unit 302 may entropy decode the scaling factors directly or index values corresponding to the scaling factors in a lookup table (e.g., an index table or mapping table). Entropy decoding unit 302 may decode the flag and the scaling factors from a slice header, a picture header, a picture parameter set (PPS), an adaptive parameter set (APS), or other high level syntax structure.

Filter unit 312 may be configured to apply at least one of a neural network-based filter, a neural network-based loop filter, a neural network-based post loop filter, an adaptive in-loop filter, or a pre-defined adaptive in-loop filter to a decoded block of video data to form one or more filtered decoded blocks. Filter unit 312 may then refine the filtered decoded blocks by applying the one or more scaling factors to the filtered decoded blocks, assuming refinement filtering is enabled. For example, filter unit 312 may apply one of formulas (3)-(8) discussed above to refine the filtered decoded blocks.

In some examples, filter unit 312 may further apply an offset value to the scaled filtered decoded blocks to form the refined filtered decoded blocks. Entropy decoding unit 302 may decode data representing the offset value(s), e.g., directly or represented by index values into a lookup table (i.e., an index table or a mapping table).

Entropy decoding unit 302 may decode data representing the scaling factors and the offset values (when applied) from a picture header, a picture parameter set (PPS), a slice header, and/or an adaptive parameter set (APS), or other such high level syntax structure.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for filtering decoded video data including a memory configured to store video data, and one or more processors implemented in circuitry and configured to decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Figure 8:
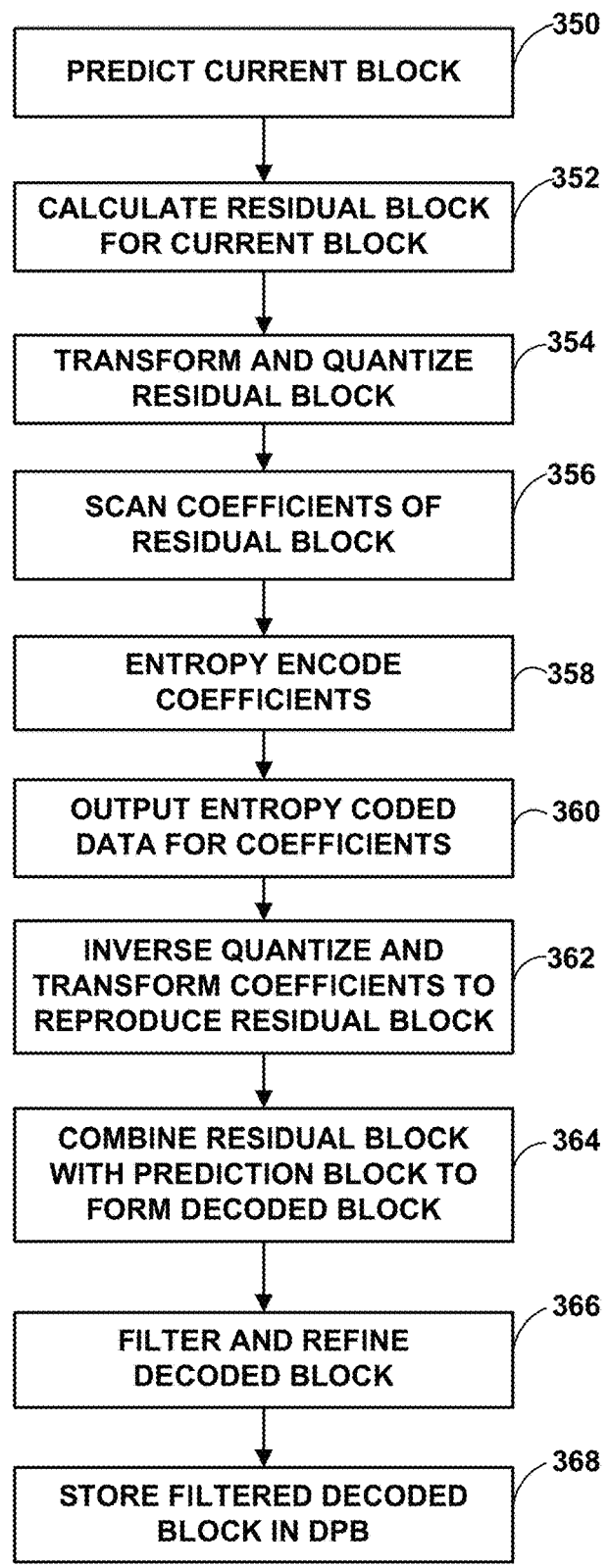
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6, it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may entropy encode the transform coefficients, e.g., using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). According to the techniques of this disclosure, video encoder 200 may filter and refine the decoded block (366). Video encoder 200 may then store the filtered decoded block in DPB 218 (368).

In this manner, the method of FIG. 8 represents an example of a method of filtering decoded video data, the method including decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Figure 9:
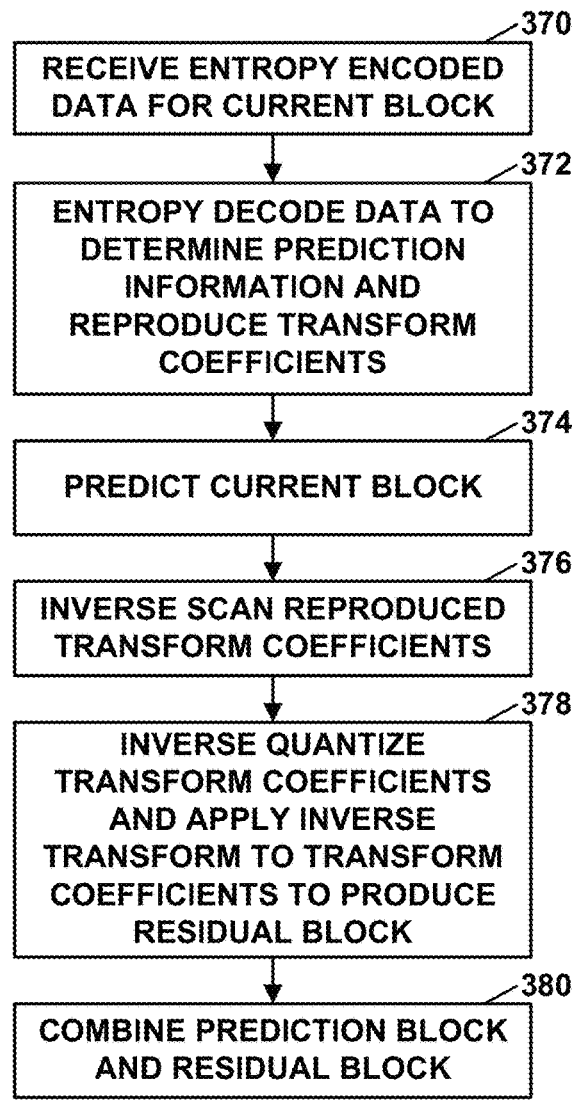
FIG. 9 is a flowchart illustrating an example method for decoding a current block in accordance with the techniques of this disclosure.

FIG. 9 is a flowchart illustrating an example method for decoding a current block of video data in accordance with the techniques of this disclosure. The current block may comprise a current CU. Although described with respect to video decoder 300 (FIGS. 1 and 7, it should be understood that other devices may be configured to perform a method similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

In this manner, the method of FIG. 9 represents an example of a method of filtering decoded video data, the method including decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Figure 10:
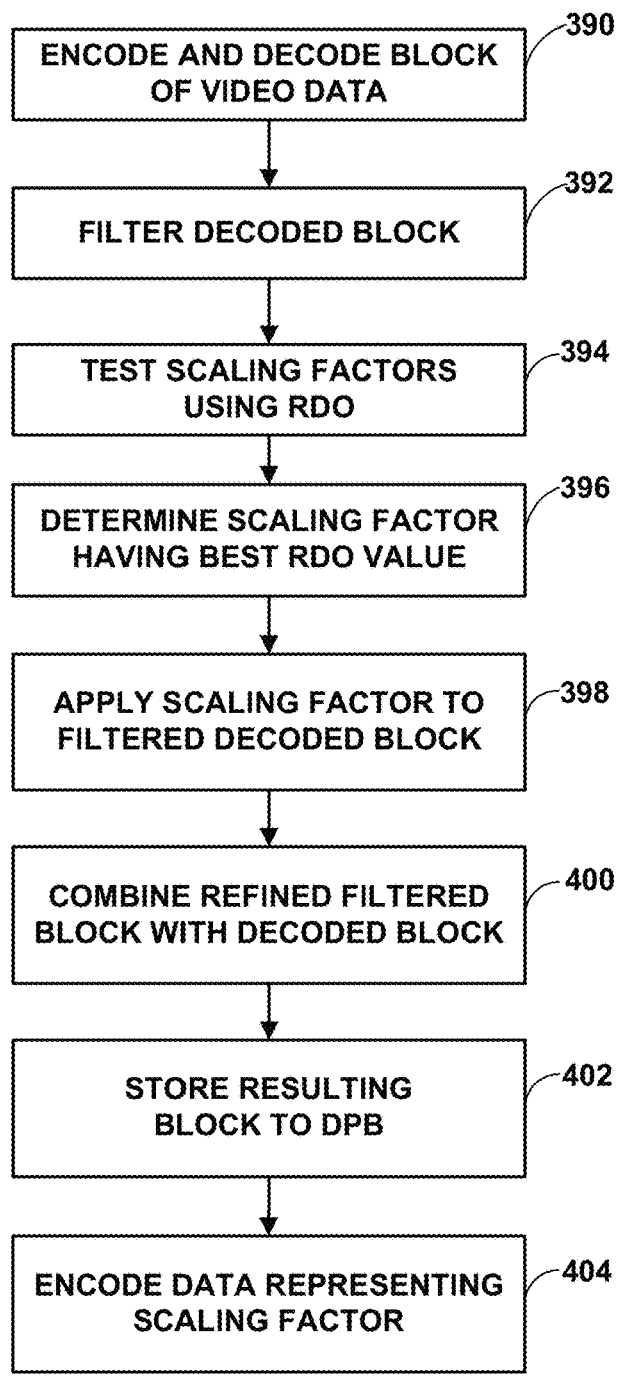
FIG. 10 is a flowchart illustrating an example method for encoding video data and for filtering decoded video data according to the techniques of this disclosure.

FIG. 10 is a flowchart illustrating an example method for encoding video data and for filtering decoded video data according to the techniques of this disclosure. The method of FIG. 10 is explained with respect to video encoder 200 of FIGS. 1 and 6, although other video encoding devices may be configured to perform this or a similar method.

Initially, video encoder 200 may encode, then subsequently decode, a block of video data (390). Video encoder 200 may then filter the decoded block (392), e.g., using one or more of a neural network-based filter, a neural network-based loop filter, a neural network-based post loop filter, an adaptive in-loop filter, or a pre-defined adaptive in-loop filter.

Video encoder 200 may then test a plurality of dynamically determined or predefined scaling factors using rate-distortion optimization (RDO) (394). For example, video encoder 200 may apply each of the scaling factors to the filtered decoded block and compare the resulting refined filtered decoded block to an original, uncoded block to calculate an RDO value. Assuming at least one of the scaling factors results in a refined filtered decoded block that yields better RDO performance than the filtered decoded block without refinement, video encoder 200 may determine to enable refinement filtering according to the techniques of this disclosure. In some examples, the RDO process may further include testing offsets applied in conjunction with the scaling factors. In some examples, video encoder 200 may test multiple different filters and/or multiple different scaling factors, potentially with offsets, as discussed above.

Video encoder 200 may then determine one of the scaling factors (or sets of scaling factors, potentially with offsets) having a best RDO value (396). Video encoder 200 may apply the determined scaling factor (or set of scaling factors and/or offset(s)) to the filtered decoded block (398). Video encoder 200 may then combine the refined filtered block(s) with the original decoded block (400), e.g., on a sample-by-sample basis, and store the resulting block to DPB 218 (402).

Moreover, video encoder 200 may encode data representing the selected scaling factor(s) (404), e.g., in a slice header, a picture header, a picture parameter set (PPS), an adaptive parameter set (APS), or other such high level syntax structure. Furthermore, video encoder 200 may encode a value for a flag enabling filter refinement as discussed above. In some examples, video encoder 200 may encode data directly representing the scaling factor(s) and/or offset(s), while in other examples, video encoder 200 may encode index value(s) corresponding to the selected scaling factor(s) and/or offset(s) in corresponding look-up tables.

In this manner, the method of FIG. 10 represents an example of a method of filtering decoded video data including decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Figure 11:
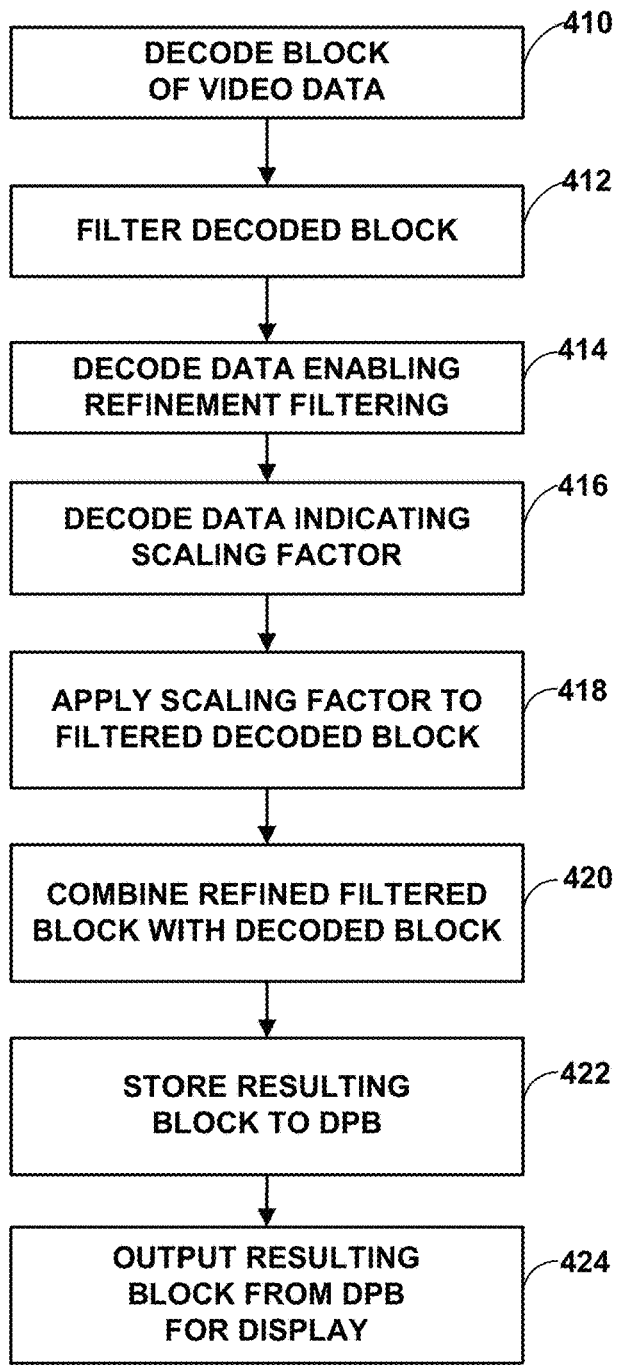
FIG. 11 is a flowchart illustrating an example method for filtering decoded video data according to the techniques of this disclosure.

FIG. 11 is a flowchart illustrating an example method for filtering decoded video data according to the techniques of this disclosure. The method of FIG. 11 is explained with respect to video decoder 300 of FIGS. 1 and 7, although other video decoding devices may be configured to perform this or a similar method.

Initially, video decoder 300 may encode, then subsequently decode, a block of video data (410). Video decoder 300 may then filter the decoded block (412), e.g., using one or more of a neural network-based filter, a neural network-based loop filter, a neural network-based post loop filter, an adaptive in-loop filter, or a pre-defined adaptive in-loop filter.

Video decoder 300 may then decode data enabling refinement filtering (414) according to the techniques of this disclosure. That is, video decoder 300 may decode a syntax element representing whether refinement filtering is enabled, and determine that a value for the syntax element indicates that refinement filtering is enabled. Video decoder 300 may then decode data indicating a scaling factor (416). For example, the data may directly represent the scaling factor or be an index value into a lookup table that maps the index value to the scaling factor. In some examples, video decoder 300 may decode data representing a set of scaling factors and/or offsets. This data may be included in a slice header, a picture header, a picture parameter set (PPS), an adaptive parameter set (APS), or other high level syntax structure. Video decoder 300 may apply the determined scaling factor (or set of scaling factors and/or offset(s)) to the filtered decoded block (418) to produce refined filtered blocks. Video decoder 300 may then combine the refined filtered block(s) with the original decoded block (420), e.g., on a sample-by-sample basis, and store the resulting block to DPB 314 (422). Video decoder 300 may also output the resulting video data from DPB 314 for display, e.g., to a display device (424).

In this manner, the method of FIG. 11 represents an example of a method of filtering decoded video data including decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Certain example techniques of this disclosure are summarized in the following clauses:

Clause 1: A method of decoding video data, the method comprising: reconstructing video data; and applying a filter to the reconstructed video data, wherein applying the filter includes refining a filter output residual and adding the refined filter output residual to update input samples to the filter.

Clause 2: The method of clause 1, wherein refining the filter output residual comprises: multiplying the filter output residual by a scaling factor.

Clause 3: The method of clause 1, wherein refining the filter output residual comprises: multiplying the filter output residual by a scaling factor and adding an offset.

Clause 4: The method of any of clauses 1-3, wherein the filter is one of a neural network-based filter, a neural network-based loop filter, a neural network-based post loop filter, an adaptive in-loop filter, or a pre-defined adaptive in-loop filter.

Clause 5: The method of any combination of clauses 1-5, wherein refining the filter output residual comprises: refining the filter output residual of multiple filters.

Clause 6: The method of any of clauses 1-5, wherein coding comprises encoding.

Clause 7: The method of any of clauses 1-5, wherein coding comprises decoding.

Clause 8: A device for coding video data, the device comprising one or more means for performing the method of any of clauses 1-7.

Clause 9: The device of clause 8, wherein the one or more means comprise one or more processors implemented in circuitry.

Clause 10: The device of any of clauses 8 and 9, further comprising a memory to store the video data.

Clause 11: The device of any of clauses 8-10, further comprising a display configured to display decoded video data.

Clause 12: The device of any of clauses 8-11, wherein the device comprises one or more of a camera, a computer, a mobile device, a broadcast receiver device, or a set-top box.

Clause 13: The device of any of clauses 8-12, wherein the device comprises a video decoder.

Clause 14: The device of any of clauses 8-13, wherein the device comprises a video encoder.

Clause 15: A computer-readable storage medium having stored thereon instructions that, when executed, cause one or more processors to perform the method of any of clauses 1-7.

Clause 16: A method of filtering decoded video data, the method comprising: decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Clause 17: The method of clause 16, further comprising decoding a value of a syntax element representing the scaling factor.

Clause 18: The method of clause 17, wherein decoding the value of the syntax element comprises decoding a picture header of a picture including the block, the picture header including the syntax element representing the scaling factor.

Clause 19: The method of clause 17, wherein decoding the value of the syntax element comprises decoding at least one of a slice header of a slice including the block and the slice header including the syntax element, an adaptive parameter set (APS) for the slice and the APS including the syntax element, or a block header of the block and the block header including the syntax element.

Clause 20: The method of any of clauses 17-19, wherein decoding the value of the syntax element comprises decoding an index value mapped to the scaling factor in an index table, the method further comprising determining the scaling factor from the index value using the index table.

Clause 21: The method of any of clauses 17-20, further comprising inverse quantizing the value by an integer value having a pre-defined bit accuracy.

Clause 22: The method of any of clauses 16-21, wherein the scaling factor comprises a first scaling factor of a plurality of scaling factors, and wherein multiplying the samples of the filtered block by the scaling factor comprises multiplying the samples of the filtered block by each of the scaling factors in the plurality of scaling factors.

Clause 23: The method of any of clauses 16-22, wherein multiplying the samples of the filtered block by the scaling factor to form the refined filtered block further comprises adding an offset to products of the samples of the filtered block and the scaling factor to form the refined filtered block.

Clause 24: The method of any of clauses 16-22, wherein multiplying the samples of the filtered block by the scaling factor to form the refined filtered block further comprises: determining an offset value; applying a bitwise shift to the offset value to form a shifted offset value; and adding the shifted offset value to products of the samples of the filtered block and the scaling factor to form the refined filtered block.

Clause 25: The method of any of clauses 16-24, wherein applying the filter comprises applying at least one of a neural network-based filter, a neural network-based loop filter, a neural network-based post loop filter, an adaptive in-loop filter, or a pre-defined adaptive in-loop filter.

Clause 26: The method of any of clauses 16-25, further comprising, prior to multiplying the samples of the filtered block by the scaling factor, determining that a syntax element representing whether to refine the filtered block has a value indicating to refine the filtered block.

Clause 27: The method of clause 26, further comprising decoding the value of the syntax element representing whether to refine the filtered block in at least one of a slice header of a slice including the block, a picture header of a picture including the block, or an adaptive parameter set (APS) corresponding to the slice including the block.

Clause 28: The method of any of clauses 16-27, wherein the filter comprises a first filter, the filtered block comprises a first filtered block, the refined filtered block comprises a first refined filtered block, and the scaling factor comprises a first scaling factor, the method further comprising: applying a second filter to the decoded block to form a second filtered block; and multiplying samples of the second filtered block by a second scaling factor to form a second refined filtered block, wherein combining the samples of the first refined filtered block with the corresponding samples of the decoded block comprises combining the samples of the first refined filtered block and samples of the second refined filtered block with the corresponding samples of the decoded block.

Clause 29: The method of any of clauses 16-27, wherein the filter comprises a first filter, the filtered block comprises a first filtered block, the refined filtered block comprises a first refined filtered block, and the scaling factor comprises a first scaling factor, wherein applying the first filter to the decoded block comprises applying each of a plurality of filters, including the first filter, to the decoded block to form a respective plurality of filtered blocks including the first filtered block; and wherein multiplying the samples of the first filtered block by the first scaling factor comprises multiplying samples of the respective plurality of filtered blocks, including the first filtered block, by a respective plurality of scaling factors, including the first scaling factor, to form a plurality of refined filtered blocks including the first refined filtered block, wherein combining the samples of the first refined filtered block with the corresponding samples of the decoded block comprises combining the samples of each of the plurality of refined filtered blocks with the corresponding samples of the decoded block.

Clause 30: The method of any of clauses 16-29, further comprising encoding the current block prior to decoding the current block.

Clause 31: A device for filtering decoded video data, the device comprising: a memory configured to store video data; and one or more processors implemented in circuitry and configured to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Clause 32: The device of clause 31, wherein the one or more processors are further configured to decode a value of a syntax element representing the scaling factor.

Clause 33: The device of clause 32, wherein to decode the value of the syntax element, the one or more processors are configured to decode a picture header of a picture including the block, the picture header including the syntax element representing the scaling factor.

Clause 34: The device of clause 32, wherein to decode the value of the syntax element, the one or more processors are configured to decode at least one of a slice header of a slice including the block and the slice header including the syntax element, an adaptive parameter set (APS) for the slice and the APS including the syntax element, or a block header of the block and the block header including the syntax element.

Clause 35: The device of any of clauses 32-34, wherein to decode the value of the syntax element, the one or more processors are configured to decode an index value mapped to the scaling factor in an index table and to determine the scaling factor from the index value using the index table.

Clause 36: The device any of clauses 32-35, wherein the one or more processors are further configured to inverse quantize the value by an integer value having a pre-defined bit accuracy.

Clause 37: The device of any of clauses 31-36, wherein the scaling factor comprises a first scaling factor of a plurality of scaling factors, and wherein the one or more processors are configured to multiply the samples of the filtered block by each of the scaling factors in the plurality of scaling factors.

Clause 38: The device of any of clauses 31-37, wherein the one or more processors are configured to add an offset to products of the samples of the filtered block and the scaling factor to form the refined filtered block.

Clause 39: The device of any of clauses 31-37, wherein to form the refined filtered block, the one or more processors are configured to: determine an offset value; apply a bitwise shift to the offset value to form a shifted offset value; and add the shifted offset value to products of the samples of the filtered block and the scaling factor to form the refined filtered block.

Clause 40: The device of any of clauses 31-39, wherein to apply the filter, the one or more processors are configured to apply at least one of a neural network-based filter, a neural network-based loop filter, a neural network-based post loop filter, an adaptive in-loop filter, or a pre-defined adaptive in-loop filter.

Clause 41: The device of any of clauses 31-40, wherein the one or more processors are further configured to, prior to multiplying the samples of the filtered block by the scaling factor, determine that a syntax element representing whether to refine the filtered block has a value indicating to refine the filtered block.

Clause 42: The device of clause 41, wherein the one or more processors are further configured to decode the value of the syntax element representing whether to refine the filtered block in at least one of a slice header of a slice including the block, a picture header of a picture including the block, or an adaptive parameter set (APS) corresponding to the slice including the block.

Clause 43: The device of any of clauses 31-42, wherein the filter comprises a first filter, the filtered block comprises a first filtered block, the refined filtered block comprises a first refined filtered block, and the scaling factor comprises a first scaling factor, and wherein the one or more processors are further configured to: apply a second filter to the decoded block to form a second filtered block; and multiply samples of the second filtered block by a second scaling factor to form a second refined filtered block, wherein to combine the samples of the first refined filtered block with the corresponding samples of the decoded block, the one or more processors are configured to combine the samples of the first refined filtered block and samples of the second refined filtered block with the corresponding samples of the decoded block.

Clause 44: The device of any of clauses 31-42, wherein the filter comprises a first filter, the filtered block comprises a first filtered block, the refined filtered block comprises a first refined filtered block, and the scaling factor comprises a first scaling factor, and wherein the one or more processors are configured to: apply each of a plurality of filters, including the first filter, to the decoded block to form a respective plurality of filtered blocks including the first filtered block; and multiply samples of the respective plurality of filtered blocks, including the first filtered block, by a respective plurality of scaling factors, including the first scaling factor, to form a plurality of refined filtered blocks including the first refined filtered block, wherein to combine the samples of the first refined filtered block with the corresponding samples of the decoded block, the one or more processors are configured to combine the samples of each of the plurality of refined filtered blocks with the corresponding samples of the decoded block.

Clause 45: The device of any of clauses 31-44, wherein the one or more processors are further configured to encode the current block prior to decoding the current block.

Clause 46: The device of any of clauses 31-45, further comprising a display configured to display decoded video data.

Clause 47: The device of any of clauses 31-46, wherein the device comprises one or more of a camera, a computer, a mobile device, a broadcast receiver device, or a set-top box.

Clause 48: A computer-readable storage medium having stored thereon instructions that, when executed, cause a processor to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Clause 49: The computer-readable storage medium of clause 48, further comprising instructions that cause the processor to decode a value of a syntax element representing the scaling factor.

Clause 50: The computer-readable storage medium of clause 49, wherein the instructions that cause the processor to decode the value of the syntax element comprise instructions that cause the processor to decode a picture header of a picture including the block, the picture header including the syntax element representing the scaling factor.

Clause 51: The computer-readable storage medium of clause 49, wherein the instructions that cause the processor to decode the value of the syntax element comprise instructions that cause the processor to decode at least one of a slice header of a slice including the block and the slice header including the syntax element, an adaptive parameter set (APS) for the slice and the APS including the syntax element, or a block header of the block and the block header including the syntax element.

Clause 52: The computer-readable storage medium of any of clauses 49-51, wherein the instructions that cause the processor to decode the value of the syntax element comprise instructions that cause the processor to decode an index value mapped to the scaling factor in an index table, the method further comprising determining the scaling factor from the index value using the index table.

Clause 53: The computer-readable storage medium of any of clauses 49-52, further comprising instructions that cause the processor to inverse quantize the value by an integer value having a pre-defined bit accuracy.

Clause 54: The computer-readable storage medium of any of clauses 48-53, wherein the scaling factor comprises a first scaling factor of a plurality of scaling factors, and wherein the instructions that cause the processor to multiply the samples of the filtered block by the scaling factor comprise instructions that cause the processor to multiply the samples of the filtered block by each of the scaling factors in the plurality of scaling factors.

Clause 55: The computer-readable storage medium of any of clauses 48-54, wherein the instructions that cause the processor to multiply the samples of the filtered block by the scaling factor to form the refined filtered block further comprise instructions that cause the processor to add an offset to products of the samples of the filtered block and the scaling factor to form the refined filtered block.

Clause 56: The computer-readable storage medium of any of clauses 48-55, wherein the instructions that cause the processor to multiply the samples of the filtered block by the scaling factor to form the refined filtered block further comprise instructions that cause the processor to: determine an offset value; apply a bitwise shift to the offset value to form a shifted offset value; and add the shifted offset value to products of the samples of the filtered block and the scaling factor to form the refined filtered block.

Clause 57: The computer-readable storage medium of any of clauses 48-56, wherein the instructions that cause the processor to apply the filter comprise instructions that cause the processor to apply at least one of a neural network-based filter, a neural network-based loop filter, a neural network-based post loop filter, an adaptive in-loop filter, or a pre-defined adaptive in-loop filter.

Clause 58: The computer-readable storage medium of any of clauses 48-57, further comprising instructions that cause the processor to, prior to multiplying the samples of the filtered block by the scaling factor, determine that a syntax element representing whether to refine the filtered block has a value indicating to refine the filtered block.

Clause 59: The computer-readable storage medium of any of clauses 48-58, further comprising instructions that cause the processor to decode the value of the syntax element representing whether to refine the filtered block in at least one of a slice header of a slice including the block, a picture header of a picture including the block, or an adaptive parameter set (APS) corresponding to the slice including the block.

Clause 60: The computer-readable storage medium of any of clauses 48-59, wherein the filter comprises a first filter, the filtered block comprises a first filtered block, the refined filtered block comprises a first refined filtered block, and the scaling factor comprises a first scaling factor, further comprising instructions that cause the processor to: apply a second filter to the decoded block to form a second filtered block; and multiply samples of the second filtered block by a second scaling factor to form a second refined filtered block, wherein the instructions that cause the processor to combine the samples of the first refined filtered block with the corresponding samples of the decoded block comprise instructions that cause the processor to combine the samples of the first refined filtered block and samples of the second refined filtered block with the corresponding samples of the decoded block.

Clause 61: The computer-readable storage medium of any of clauses 48-59, wherein the filter comprises a first filter, the filtered block comprises a first filtered block, the refined filtered block comprises a first refined filtered block, and the scaling factor comprises a first scaling factor, wherein the instructions that cause the processor to apply the first filter to the decoded block comprise instructions that cause the processor to applying each of a plurality of filters, including the first filter, to the decoded block to form a respective plurality of filtered blocks including the first filtered block; and wherein the instructions that cause the processor to multiply the samples of the first filtered block by the first scaling factor comprise instructions that cause the processor to multiply samples of the respective plurality of filtered blocks, including the first filtered block, by a respective plurality of scaling factors, including the first scaling factor, to form a plurality of refined filtered blocks including the first refined filtered block, wherein the instructions that cause the processor to combine the samples of the first refined filtered block with the corresponding samples of the decoded block comprise instructions that cause the processor to combine the samples of each of the plurality of refined filtered blocks with the corresponding samples of the decoded block.

Clause 62: The computer-readable storage medium of any of clauses 48-61, further comprising instructions that cause the processor to encode the current block prior to decoding the current block.

Clause 63: A device for filtering decoded video data, the device comprising: means for decoding a block of video data to form a decoded block; means for applying a filter to the decoded block to form a filtered block; means for multiplying samples of the filtered block by a scaling factor to form a refined filtered block; and means for combining samples of the refined filtered block with corresponding samples of the decoded block.

Clause 64: A method of filtering decoded video data, the method comprising: decoding a block of video data to form a decoded block; applying a filter to the decoded block to form a filtered block; multiplying samples of the filtered block by a scaling factor to form a refined filtered block; and combining samples of the refined filtered block with corresponding samples of the decoded block.

Clause 65: The method of clause 64, further comprising decoding a value of a syntax element representing the scaling factor.

Clause 66: The method of clause 65, wherein decoding the value of the syntax element comprises decoding a picture header of a picture including the block, the picture header including the syntax element representing the scaling factor.

Clause 67: The method of clause 65, wherein decoding the value of the syntax element comprises decoding at least one of a slice header of a slice including the block and the slice header including the syntax element, an adaptive parameter set (APS) for the slice and the APS including the syntax element, or a block header of the block and the block header including the syntax element.

Clause 68: The method of clause 65, wherein decoding the value of the syntax element comprises decoding an index value mapped to the scaling factor in an index table, the method further comprising determining the scaling factor from the index value using the index table.

Clause 69: The method of clause 65, further comprising inverse quantizing the value by an integer value having a pre-defined bit accuracy.

Clause 70: The method of clause 64, wherein the scaling factor comprises a first scaling factor of a plurality of scaling factors, and wherein multiplying the samples of the filtered block by the scaling factor comprises multiplying the samples of the filtered block by each of the scaling factors in the plurality of scaling factors.

Clause 71: The method of clause 64, wherein multiplying the samples of the filtered block by the scaling factor to form the refined filtered block further comprises adding an offset to products of the samples of the filtered block and the scaling factor to form the refined filtered block.

Clause 72: The method of clause 64, wherein multiplying the samples of the filtered block by the scaling factor to form the refined filtered block further comprises: determining an offset value; applying a bitwise shift to the offset value to form a shifted offset value; and adding the shifted offset value to products of the samples of the filtered block and the scaling factor to form the refined filtered block.

Clause 73: The method of clause 64, wherein applying the filter comprises applying at least one of a neural network-based filter, a neural network-based loop filter, a neural network-based post loop filter, an adaptive in-loop filter, or a pre-defined adaptive in-loop filter.

Clause 74: The method of clause 64, further comprising, prior to multiplying the samples of the filtered block by the scaling factor, determining that a syntax element representing whether to refine the filtered block has a value indicating to refine the filtered block.

Clause 75: The method of clause 74, further comprising decoding the value of the syntax element representing whether to refine the filtered block in at least one of a slice header of a slice including the block, a picture header of a picture including the block, or an adaptive parameter set (APS) corresponding to the slice including the block.

Clause 76: The method of clause 64, wherein the filter comprises a first filter, the filtered block comprises a first filtered block, the refined filtered block comprises a first refined filtered block, and the scaling factor comprises a first scaling factor, the method further comprising: applying a second filter to the decoded block to form a second filtered block; and multiplying samples of the second filtered block by a second scaling factor to form a second refined filtered block, wherein combining the samples of the first refined filtered block with the corresponding samples of the decoded block comprises combining the samples of the first refined filtered block and samples of the second refined filtered block with the corresponding samples of the decoded block.

Clause 77: The method of clause 64, wherein the filter comprises a first filter, the filtered block comprises a first filtered block, the refined filtered block comprises a first refined filtered block, and the scaling factor comprises a first scaling factor, wherein applying the first filter to the decoded block comprises applying each of a plurality of filters, including the first filter, to the decoded block to form a respective plurality of filtered blocks including the first filtered block; and wherein multiplying the samples of the first filtered block by the first scaling factor comprises multiplying samples of the respective plurality of filtered blocks, including the first filtered block, by a respective plurality of scaling factors, including the first scaling factor, to form a plurality of refined filtered blocks including the first refined filtered block, wherein combining the samples of the first refined filtered block with the corresponding samples of the decoded block comprises combining the samples of each of the plurality of refined filtered blocks with the corresponding samples of the decoded block.

Clause 78: The method of clause 64, further comprising encoding the current block prior to decoding the current block.

Clause 79: A device for filtering decoded video data, the device comprising: a memory configured to store video data; and one or more processors implemented in circuitry and configured to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Clause 80: The device of clause 79, wherein the one or more processors are further configured to decode a value of a syntax element representing the scaling factor.

Clause 81: The device of clause 80, wherein to decode the value of the syntax element, the one or more processors are configured to decode a picture header of a picture including the block, the picture header including the syntax element representing the scaling factor.

Clause 82: The device of clause 80, wherein to decode the value of the syntax element, the one or more processors are configured to decode at least one of a slice header of a slice including the block and the slice header including the syntax element, an adaptive parameter set (APS) for the slice and the APS including the syntax element, or a block header of the block and the block header including the syntax element.

Clause 83: The device of clause 80, wherein to decode the value of the syntax element, the one or more processors are configured to decode an index value mapped to the scaling factor in an index table and to determine the scaling factor from the index value using the index table.

Clause 84: The device of clause 80, wherein the one or more processors are further configured to inverse quantize the value by an integer value having a pre-defined bit accuracy.

Clause 85: The device of clause 79, wherein the scaling factor comprises a first scaling factor of a plurality of scaling factors, and wherein the one or more processors are configured to multiply the samples of the filtered block by each of the scaling factors in the plurality of scaling factors.

Clause 86: The device of clause 79, wherein the one or more processors are configured to add an offset to products of the samples of the filtered block and the scaling factor to form the refined filtered block.

Clause 87: The device of clause 79, wherein to form the refined filtered block, the one or more processors are configured to: determine an offset value; apply a bitwise shift to the offset value to form a shifted offset value; and add the shifted offset value to products of the samples of the filtered block and the scaling factor to form the refined filtered block.

Clause 88: The device of clause 79, wherein to apply the filter, the one or more processors are configured to apply at least one of a neural network-based filter, a neural network-based loop filter, a neural network-based post loop filter, an adaptive in-loop filter, or a pre-defined adaptive in-loop filter.

Clause 89: The device of clause 79, wherein the one or more processors are further configured to, prior to multiplying the samples of the filtered block by the scaling factor, determine that a syntax element representing whether to refine the filtered block has a value indicating to refine the filtered block.

Clause 90: The device of clause 89, wherein the one or more processors are further configured to decode the value of the syntax element representing whether to refine the filtered block in at least one of a slice header of a slice including the block, a picture header of a picture including the block, or an adaptive parameter set (APS) corresponding to the slice including the block.

Clause 91: The device of clause 79, wherein the filter comprises a first filter, the filtered block comprises a first filtered block, the refined filtered block comprises a first refined filtered block, and the scaling factor comprises a first scaling factor, and wherein the one or more processors are further configured to: apply a second filter to the decoded block to form a second filtered block; and multiply samples of the second filtered block by a second scaling factor to form a second refined filtered block, wherein to combine the samples of the first refined filtered block with the corresponding samples of the decoded block, the one or more processors are configured to combine the samples of the first refined filtered block and samples of the second refined filtered block with the corresponding samples of the decoded block.

Clause 92: The device of clause 79, wherein the filter comprises a first filter, the filtered block comprises a first filtered block, the refined filtered block comprises a first refined filtered block, and the scaling factor comprises a first scaling factor, and wherein the one or more processors are configured to: apply each of a plurality of filters, including the first filter, to the decoded block to form a respective plurality of filtered blocks including the first filtered block; and multiply samples of the respective plurality of filtered blocks, including the first filtered block, by a respective plurality of scaling factors, including the first scaling factor, to form a plurality of refined filtered blocks including the first refined filtered block, wherein to combine the samples of the first refined filtered block with the corresponding samples of the decoded block, the one or more processors are configured to combine the samples of each of the plurality of refined filtered blocks with the corresponding samples of the decoded block.

Clause 93: The device of clause 79, wherein the one or more processors are further configured to encode the current block prior to decoding the current block.

Clause 94: The device of clause 79, further comprising a display configured to display decoded video data.

Clause 95: The device of clause 79, wherein the device comprises one or more of a camera, a computer, a mobile device, a broadcast receiver device, or a set-top box.

Clause 96: A computer-readable storage medium having stored thereon instructions that, when executed, cause a processor to: decode a block of video data to form a decoded block; apply a filter to the decoded block to form a filtered block; multiply samples of the filtered block by a scaling factor to form a refined filtered block; and combine samples of the refined filtered block with corresponding samples of the decoded block.

Clause 97: The computer-readable storage medium of clause 96, further comprising instructions that cause the processor to decode a value of a syntax element representing the scaling factor.

Clause 98: The computer-readable storage medium of clause 97, wherein the instructions that cause the processor to decode the value of the syntax element comprise instructions that cause the processor to decode a picture header of a picture including the block, the picture header including the syntax element representing the scaling factor.

Clause 99: The computer-readable storage medium of clause 97, wherein the instructions that cause the processor to decode the value of the syntax element comprise instructions that cause the processor to decode at least one of a slice header of a slice including the block and the slice header including the syntax element, an adaptive parameter set (APS) for the slice and the APS including the syntax element, or a block header of the block and the block header including the syntax element.

Clause 100: The computer-readable storage medium of clause 97, wherein the instructions that cause the processor to decode the value of the syntax element comprise instructions that cause the processor to decode an index value mapped to the scaling factor in an index table, the method further comprising determining the scaling factor from the index value using the index table.

Clause 101: The computer-readable storage medium of clause 97, further comprising instructions that cause the processor to inverse quantize the value by an integer value having a pre-defined bit accuracy.

Clause 102: The computer-readable storage medium of clause 96, wherein the scaling factor comprises a first scaling factor of a plurality of scaling factors, and wherein the instructions that cause the processor to multiply the samples of the filtered block by the scaling factor comprise instructions that cause the processor to multiply the samples of the filtered block by each of the scaling factors in the plurality of scaling factors.

Clause 103: The computer-readable storage medium of clause 96, wherein the instructions that cause the processor to multiply the samples of the filtered block by the scaling factor to form the refined filtered block further comprise instructions that cause the processor to add an offset to products of the samples of the filtered block and the scaling factor to form the refined filtered block.

Clause 104: The computer-readable storage medium of clause 96, wherein the instructions that cause the processor to multiply the samples of the filtered block by the scaling factor to form the refined filtered block further comprise instructions that cause the processor to: determine an offset value; apply a bitwise shift to the offset value to form a shifted offset value; and add the shifted offset value to products of the samples of the filtered block and the scaling factor to form the refined filtered block.

Clause 105: The computer-readable storage medium of clause 96, wherein the instructions that cause the processor to apply the filter comprise instructions that cause the processor to apply at least one of a neural network-based filter, a neural network-based loop filter, a neural network-based post loop filter, an adaptive in-loop filter, or a pre-defined adaptive in-loop filter.

Clause 106: The computer-readable storage medium of clause 96, further comprising instructions that cause the processor to, prior to multiplying the samples of the filtered block by the scaling factor, determine that a syntax element representing whether to refine the filtered block has a value indicating to refine the filtered block.

Clause 107: The computer-readable storage medium of clause 106, further comprising instructions that cause the processor to decode the value of the syntax element representing whether to refine the filtered block in at least one of a slice header of a slice including the block, a picture header of a picture including the block, or an adaptive parameter set (APS) corresponding to the slice including the block.

Clause 108: The computer-readable storage medium of clause 96, wherein the filter comprises a first filter, the filtered block comprises a first filtered block, the refined filtered block comprises a first refined filtered block, and the scaling factor comprises a first scaling factor, further comprising instructions that cause the processor to: apply a second filter to the decoded block to form a second filtered block; and multiply samples of the second filtered block by a second scaling factor to form a second refined filtered block, wherein the instructions that cause the processor to combine the samples of the first refined filtered block with the corresponding samples of the decoded block comprise instructions that cause the processor to combine the samples of the first refined filtered block and samples of the second refined filtered block with the corresponding samples of the decoded block.

Clause 109: The computer-readable storage medium of clause 96, wherein the filter comprises a first filter, the filtered block comprises a first filtered block, the refined filtered block comprises a first refined filtered block, and the scaling factor comprises a first scaling factor, wherein the instructions that cause the processor to apply the first filter to the decoded block comprise instructions that cause the processor to applying each of a plurality of filters, including the first filter, to the decoded block to form a respective plurality of filtered blocks including the first filtered block; and wherein the instructions that cause the processor to multiply the samples of the first filtered block by the first scaling factor comprise instructions that cause the processor to multiply samples of the respective plurality of filtered blocks, including the first filtered block, by a respective plurality of scaling factors, including the first scaling factor, to form a plurality of refined filtered blocks including the first refined filtered block, wherein the instructions that cause the processor to combine the samples of the first refined filtered block with the corresponding samples of the decoded block comprise instructions that cause the processor to combine the samples of each of the plurality of refined filtered blocks with the corresponding samples of the decoded block.

Clause 110: The computer-readable storage medium of clause 96, further comprising instructions that cause the processor to encode the current block prior to decoding the current block.

Clause 111: A device for filtering decoded video data, the device comprising: means for decoding a block of video data to form a decoded block; means for applying a filter to the decoded block to form a filtered block; means for multiplying samples of the filtered block by a scaling factor to form a refined filtered block; and means for combining samples of the refined filtered block with corresponding samples of the decoded block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering decoded video data, the method comprising:
   decoding a block of video data to form a decoded block;
   applying a filter to the decoded block to form a filtered block;
   multiplying samples of the filtered block by a scaling factor to form a refined filtered block; and
   adding values of samples of the refined filtered block to corresponding values of samples of the decoded block to form a resulting block of a decoded picture stored to a decoded picture buffer, wherein the filter comprises a first filter, the filtered block comprises a first filtered block, the refined filtered block comprises a first refined filtered block, and the scaling factor comprises a first scaling factor, the method further comprising:
   applying a second filter to the decoded block to form a second filtered block; and
   multiplying samples of the second filtered block by a second scaling factor to form a second refined filtered block,
   wherein adding the values of the samples of the first refined filtered block to the corresponding values of the samples of the decoded block comprises adding the values of the samples of the first refined filtered block and corresponding values of samples of the second refined filtered block with the corresponding values of the samples of the decoded block.

2. The method of claim 1, further comprising decoding a value of a syntax element representing the scaling factor.

3. The method of claim 2, wherein decoding the value of the syntax element comprises decoding a picture header of a picture including the block of video data, the picture header including the syntax element representing the scaling factor.

4. The method of claim 2, wherein decoding the value of the syntax element comprises decoding at least one of a slice header of a slice including the block and the slice header including the syntax element, an adaptive parameter set (APS) for the slice and the APS including the syntax element, or a block header of the block and the block header including the syntax element.

5. The method of claim 2, wherein decoding the value of the syntax element comprises decoding an index value mapped to the scaling factor in an index table, the method further comprising determining the scaling factor from the index value using the index table.

6. The method of claim 2, further comprising inverse quantizing the value of the syntax element by an integer value having a pre-defined bit accuracy.

7. The method of claim 1, wherein the scaling factor comprises a first scaling factor of a plurality of scaling factors, and wherein multiplying the samples of the filtered block by the scaling factor comprises multiplying the samples of the filtered block by each of the scaling factors in the plurality of scaling factors.

8. The method of claim 1, wherein multiplying the samples of the filtered block by the scaling factor to form the refined filtered block further comprises adding an offset to products of the samples of the filtered block and the scaling factor to form the refined filtered block.

9. The method of claim 1, wherein multiplying the samples of the filtered block by the scaling factor to form the refined filtered block further comprises:
determining an offset value;
applying a bitwise shift to the offset value to form a shifted offset value; and
adding the shifted offset value to products of the samples of the filtered block and the scaling factor to form the refined filtered block.

10. The method of claim 1, wherein applying the filter comprises applying at least one of a neural network-based filter, a neural network-based loop filter, a neural network-based post loop filter, an adaptive in-loop filter, or a pre-defined adaptive in-loop filter.

11. The method of claim 1, further comprising, prior to multiplying the samples of the filtered block by the scaling factor, determining that a syntax element representing whether to refine the filtered block has a value indicating to refine the filtered block.

12. The method of claim 11, further comprising decoding the value of the syntax element representing whether to refine the filtered block in at least one of a slice header of a slice including the block, a picture header of a picture including the block, or an adaptive parameter set (APS) corresponding to the slice including the block.

13. The method of claim 1, further comprising encoding the current block prior to decoding the current block.

14. A device for filtering decoded video data, the device comprising:
a memory configured to store video data; and
one or more processors implemented in circuitry and configured to:
decode a block of video data to form a decoded block;
apply a filter to the decoded block to form a filtered block;
multiply samples of the filtered block by a scaling factor to form a refined filtered block; and
add values of samples of the refined filtered block to corresponding values of samples of the decoded block to form a resulting block of a decoded picture stored to a decoded picture buffer, wherein the filter comprises a first filter, the filtered block comprises a first filtered block, the refined filtered block comprises a first refined filtered block, and the scaling factor comprises a first scaling factor, and wherein the one or more processors are further configured to:
apply a second filter to the decoded block to form a second filtered block; and
multiply samples of the second filtered block by a second scaling factor to form a second refined filtered block, wherein to add the values of the samples of the first refined filtered block to the corresponding values of the samples of the decoded block, the one or more processors are further configured to add the values of the samples of the first refined filtered block and corresponding values of samples of the second refined filtered block to the corresponding values of the samples of the decoded block.

15. The device of claim 14, wherein the one or more processors are further configured to decode a value of a syntax element representing the scaling factor.

16. The device of claim 15, wherein to decode the value of the syntax element, the one or more processors are configured to decode a picture header of a picture including the block of video data, the picture header including the syntax element representing the scaling factor.

17. The device of claim 15, wherein to decode the value of the syntax element, the one or more processors are configured to decode at least one of a slice header of a slice including the block and the slice header including the syntax element, an adaptive parameter set (APS) for the slice and the APS including the syntax element, or a block header of the block and the block header including the syntax element.

18. The device of claim 15, wherein to decode the value of the syntax element, the one or more processors are configured to decode an index value mapped to the scaling factor in an index table and to determine the scaling factor from the index value using the index table.

19. The device of claim 15, wherein the one or more processors are further configured to inverse quantize the value of the syntax element by an integer value having a pre-defined bit accuracy.

20. The device of claim 14, wherein the scaling factor comprises a first scaling factor of a plurality of scaling factors, and wherein the one or more processors are configured to multiply the samples of the filtered block by each of the scaling factors in the plurality of scaling factors.

21. The device of claim 14, wherein the one or more processors are configured to add an offset to products of the samples of the filtered block and the scaling factor to form the refined filtered block.

22. The device of claim 14, wherein to form the refined filtered block, the one or more processors are configured to:
determine an offset value;
apply a bitwise shift to the offset value to form a shifted offset value; and
add the shifted offset value to products of the samples of the filtered block and the scaling factor to form the refined filtered block.

23. The device of claim 14, wherein to apply the filter, the one or more processors are configured to apply at least one of a neural network-based filter, a neural network-based loop filter, a neural network-based post loop filter, an adaptive in-loop filter, or a pre-defined adaptive in-loop filter.

24. The device of claim 14, wherein the one or more processors are further configured to, prior to multiplying the samples of the filtered block by the scaling factor, determine that a syntax element representing whether to refine the filtered block has a value indicating to refine the filtered block.

25. The device of claim 24, wherein the one or more processors are further configured to decode the value of the syntax element representing whether to refine the filtered block in at least one of a slice header of a slice including the block, a picture header of a picture including the block, or an adaptive parameter set (APS) corresponding to the slice including the block.

26. The device of claim 14, wherein the one or more processors are further configured to encode the current block prior to decoding the current block.

27. The device of claim 14, further comprising a display configured to display decoded video data.

28. The device of claim 14, wherein the device comprises one or more of a camera, a computer, a mobile device, a broadcast receiver device, or a set-top box.

29. A non-transitory computer-readable storage medium having stored thereon instructions that, when executed, cause a processor to:
decode a block of video data to form a decoded block;
apply a filter to the decoded block to form a filtered block;

multiply samples of the filtered block by a scaling factor to form a refined filtered block; and add values of samples of the refined filtered block to corresponding values of samples of the decoded block to form a resulting block of a decoded picture stored to a decoded picture buffer, wherein the filter comprises a first filter, the filtered block comprises a first filtered block, the refined filtered block comprises a first refined filtered block, and the scaling factor comprises a first scaling factor, further comprising instructions that cause the processor to:

apply a second filter to the decoded block to form a second filtered block; and multiply samples of the second filtered block by a second scaling factor to form a second refined filtered block, wherein the instructions that cause the processor to add the values of the samples of the first refined filtered block to the corresponding values of the samples of the decoded block comprise instructions that cause the processor to add the values of the samples of the first refined filtered block and corresponding values of samples of the second refined filtered block to the corresponding values of the samples of the decoded block.

30. The non-transitory computer-readable storage medium of claim 29, further comprising instructions that cause the processor to decode a value of a syntax element representing the scaling factor.

31. The non-transitory computer-readable storage medium of claim 30, wherein the instructions that cause the processor to decode the value of the syntax element comprise instructions that cause the processor to decode a picture header of a picture including the block of video data, the picture header including the syntax element representing the scaling factor.

32. The non-transitory computer-readable storage medium of claim 30, wherein the instructions that cause the processor to decode the value of the syntax element comprise instructions that cause the processor to decode at least one of a slice header of a slice including the block and the slice header including the syntax element, an adaptive parameter set (APS) for the slice and the APS including the syntax element, or a block header of the block and the block header including the syntax element.

33. The non-transitory computer-readable storage medium of claim 30, wherein the instructions that cause the processor to decode the value of the syntax element comprise instructions that cause the processor to decode an index value mapped to the scaling factor in an index table, the method further comprising determining the scaling factor from the index value using the index table.

34. The non-transitory computer-readable storage medium of claim 30, further comprising instructions that cause the processor to inverse quantize the value of the syntax element by an integer value having a pre-defined bit accuracy.

35. The non-transitory computer-readable storage medium of claim 29, wherein the scaling factor comprises a first scaling factor of a plurality of scaling factors, and wherein the instructions that cause the processor to multiply the samples of the filtered block by the scaling factor comprise instructions that cause the processor to multiply the samples of the filtered block by each of the scaling factors in the plurality of scaling factors.

36. The non-transitory computer-readable storage medium of claim 29, wherein the instructions that cause the processor to multiply the samples of the filtered block by the scaling factor to form the refined filtered block further comprise instructions that cause the processor to add an offset to products of the samples of the filtered block and the scaling factor to form the refined filtered block.

37. The non-transitory computer-readable storage medium of claim 29, wherein the instructions that cause the processor to multiply the samples of the filtered block by the scaling factor to form the refined filtered block further comprise instructions that cause the processor to:

determine an offset value;

apply a bitwise shift to the offset value to form a shifted offset value; and add the shifted offset value to products of the samples of the filtered block and the scaling factor to form the refined filtered block.

38. The non-transitory computer-readable storage medium of claim 29, wherein the instructions that cause the processor to apply the filter comprise instructions that cause the processor to apply at least one of a neural network-based filter, a neural network-based loop filter, a neural network-based post loop filter, an adaptive in-loop filter, or a pre-defined adaptive in-loop filter.

39. The non-transitory computer-readable storage medium of claim 29, further comprising instructions that cause the processor to, prior to multiplying the samples of the filtered block by the scaling factor, determine that a syntax element representing whether to refine the filtered block has a value indicating to refine the filtered block.

40. The non-transitory computer-readable storage medium of claim 39, further comprising instructions that cause the processor to decode the value of the syntax element representing whether to refine the filtered block in at least one of a slice header of a slice including the block, a picture header of a picture including the block, or an adaptive parameter set (APS) corresponding to the slice including the block.

41. The non-transitory computer-readable storage medium of claim 29, further comprising instructions that cause the processor to encode the current block prior to decoding the current block.

42. A device for filtering decoded video data, the device comprising:

means for decoding a block of video data to form a decoded block;

means for applying a filter to the decoded block to form a filtered block;

means for multiplying samples of the filtered block by a scaling factor to form a refined filtered block; and means for adding values of samples of the refined filtered block to corresponding values of samples of the decoded block to form a resulting block of a decoded picture stored to a decoded picture buffer, wherein the means for applying the filter comprises means for applying a first filter, the filtered block comprises a first filtered block, the refined filtered block comprises a first refined filtered block, and the scaling factor comprises a first scaling factor, the device further comprises:

means for applying a second filter to the decoded block to form a second filtered block; and means for multiplying samples of the second filtered block by a second scaling factor to form a second refined filtered block, wherein the means for adding the values of the samples of the first refined filtered block to the corresponding values of the samples of the decoded block comprises means for adding the values of the samples of the first refined filtered block and corresponding values of samples of the second refined filtered block with the corresponding values of the samples of the decoded block.

43. The device of claim 42, further comprising means for decoding a value of a syntax element representing the scaling factor.

44. The device of claim 43, wherein the means for decoding the value of the syntax element comprises means for decoding a picture header of a picture including the block of video data, the picture header including the syntax element representing the scaling factor.

45. The device of claim 43, wherein the means for decoding the value of the syntax element comprises means for decoding at least one of a slice header of a slice including the block and the slice header including the syntax element, an adaptive parameter set (APS) for the slice and the APS including the syntax element, or a block header of the block and the block header including the syntax element.

46. The device of claim 43, wherein the means for decoding the value of the syntax element comprises means for decoding an index value mapped to the scaling factor in an index table, the device further comprising means for determining the scaling factor from the index value using the index table.

47. The device of claim 43, further comprising means for inverse quantizing the value of the syntax element by an integer value having a pre-defined bit accuracy.

48. The device of claim 42, wherein the scaling factor comprises a first scaling factor of a plurality of scaling factors, and wherein the means for multiplying the samples of the filtered block by the scaling factor comprises means for multiplying the samples of the filtered block by each of the scaling factors in the plurality of scaling factors.

49. The device of claim 42, wherein the means for multiplying the samples of the filtered block by the scaling factor to form the refined filtered block further comprises means for adding an offset to products of the samples of the filtered block and the scaling factor to form the refined filtered block.

50. The device of claim 42, wherein the means for multiplying the samples of the filtered block by the scaling factor to form the refined filtered block further comprises:
 means for determining an offset value;
 means for applying a bitwise shift to the offset value to form a shifted offset value; and
 means for adding the shifted offset value to products of the samples of the filtered block and the scaling factor to form the refined filtered block.

51. The device of claim 42, wherein the means for applying the filter comprises means for applying at least one of a neural network-based filter, means for applying a neural network-based loop filter, means for applying a neural network-based post loop filter, means for applying an adaptive in-loop filter, or means for applying a pre-defined adaptive in-loop filter.

52. The device of claim 42, further comprising means for determining that a syntax element representing whether to refine the filtered block has a value indicating to refine the filtered block.

53. The device of claim 52, further comprising means for decoding the value of the syntax element representing whether to refine the filtered block in at least one of a slice header of a slice including the block, a picture header of a picture including the block, or an adaptive parameter set (APS) corresponding to the slice including the block.

54. The device of claim 42, further comprising means for encoding the current block prior to decoding the current block.

\* \* \* \* \*